(12) United States Patent
Hong et al.

(10) Patent No.: US 6,819,986 B2
(45) Date of Patent: Nov. 16, 2004

(54) SYSTEM AND METHOD FOR COLLECTING VEHICLE DATA AND DIAGNOSING THE VEHICLE, AND METHOD FOR AUTOMATICALLY SETTING THE VEHICLE CONVENIENCE APPARATUS USING SMARTCARD

(75) Inventors: Seok-Woo Hong, Seoul (KR); Myong-Shick Lee, Seoul (KR); Pyo-Lyul Jeong, Seoul (KR)

(73) Assignee: Tellsyn Co., LTD, Seol (KR)

( * ) Notice: Subject to any disclaimer, the term of this patent is extended or adjusted under 35 U.S.C. 154(b) by 80 days.

(21) Appl. No.: 10/162,271

(22) Filed: Jun. 3, 2002

(65) Prior Publication Data

US 2003/0069673 A1 Apr. 10, 2003

(30) Foreign Application Priority Data

Aug. 10, 2001 (KR) .............................. 10-2001-0048378
Nov. 23, 2001 (KR) .............................. 10-2001-0073195

(51) Int. Cl.$^7$ ............................................. B60R 25/10
(52) U.S. Cl. .................... 701/29; 340/439; 340/825.15; 725/28; 725/30; 345/661
(58) Field of Search .............................. 701/33, 31, 35, 701/66, 29; 340/439, 459, 825.15, 825.69, 5.21, 5.2, 5.22, 5.51, 5.54, 5.74, 5.8, 5.85, 5.3, 426, 438; 370/313; 725/10, 11, 13, 25, 28, 30; 345/650, 661; 709/203

(56) References Cited

U.S. PATENT DOCUMENTS

| | | | | |
|---|---|---|---|---|
| 4,113,980 A | * | 9/1978 | Bell | 174/52.1 |
| 4,270,174 A | * | 5/1981 | Karlin et al. | 701/115 |
| 4,404,639 A | * | 9/1983 | McGuire et al. | 701/35 |
| 5,938,716 A | * | 8/1999 | Shutty et al. | 701/115 |
| 6,006,146 A | * | 12/1999 | Usui et al. | 701/29 |
| 6,134,488 A | * | 10/2000 | Sasaki et al. | 701/31 |
| 6,170,742 B1 | * | 1/2001 | Yacoob | 235/375 |
| 6,198,996 B1 | * | 3/2001 | Berstis | 701/36 |
| 6,259,769 B1 | * | 7/2001 | Page et al. | 235/375 |
| 6,317,721 B1 | * | 11/2001 | Hurta et al. | 705/13 |
| 2001/0034760 A1 | * | 10/2001 | Paton | 709/203 |
| 2001/0040504 A1 | * | 11/2001 | Gehlot | 340/426 |
| 2002/0195503 A1 | * | 12/2002 | Allen et al. | 239/144 |

* cited by examiner

Primary Examiner—Thomas G. Black
Assistant Examiner—Tuan C To
(74) Attorney, Agent, or Firm—Blakely, Sokoloff, Taylor & Zafman LLP

(57) ABSTRACT

The present invention provides a system and method for collecting vehicle data and diagnosing the vehicle, and method for automatically setting the vehicle convenience apparatus using smartcard so as to settle the problem of the existing arbitrary vehicle care and maintenance.

The system of the present invention comprises a smartcard which includes vehicle-related data comprising the vehicle basic information data and vehicle maintenance information data, a smartcard control unit (SCU) which is connected to an electronic controller, mechanical controller, and sensors inside the vehicle and collects information from the vehicle, reads the vehicle-related data from the smartcard, or records the information collected from the vehicle in smartcard, a terminal unit which reads the vehicle-related data from the smartcard and diagnoses the vehicle, and stores its result in the smartcard.

35 Claims, 14 Drawing Sheets

Fig. 2

INFORMATION STRUCTURE STORED IN SMARTCARD

| BASIC VEHICLE INFORMATION DATA | UNCHANGEABLE ITEMS |
| --- | --- |
| | UPDATABLE ITEMS |
| VEHICLE MAINTENANCE INFORMATION DATA | UPDATE ITEMS FROM SCU |
| | UPDATE ITEMS FROM EXTERNAL DEVICES |
| DRIVER'S CONVENIENCE INFORMATION DATA | |
| JOINT APPLICATION INFORMATION DATA | |
| OTHER INFORMATION DATA | |

INFORMATION STRUCTURE STORED IN SCU

| BASIC VEHICLE INFORMATION DATA | UNCHANGEABLE ITEMS |
| --- | --- |
| | |
| VEHICLE MAINTENANCE INFORMATION DATA | UPDATE ITEMS FROM VARIOUS CU |
| | UPDATE ITEMS FROM THE SMARTCARD |
| DRIVER'S CONVENIENCE INFORMATION DATA | |
| | |
| OTHER INFORMATION DATA | |

SYSTEM AND METHOD FOR COLLECTING VEHICLE DATA AND DIAGNOSING THE VEHICLE, AND METHOD FOR AUTOMATICALLY SETTING THE VEHICLE CONVENIENCE APPARATUS USING SMARTCARD

TECHNICAL FIELD

The present invention is an application with a request for priority based on Republic of Korea Patent Application Nos. 2001-48378 and 2001-73195, and relates to a vehicle diagnosis and management system using a smartcard. More particularly, the present invention relates to vehicle diagnosis system and method enabling vehicle diagnoses by collecting data occurring from a vehicle and reading the collected vehicle-related data on-line and off-line in use of the smartcard and a smartcard control unit, and to a method for automatically setting driver's convenience apparatus inside the vehicle by using the smartcard.

BACKGROUND ART

Prior vehicle maintenance and management basically has lots of non-systematic and arbitrary sides. A driver relies on his own vehicle-related knowledge as to various normal and abnormal functions of the vehicle or is able to judge if the vehicle functions are normal or abnormal through check engine warning lights and the like on the dashboard which are transferred from the engine control unit (ECU) of the vehicle. In addition, a vehicle repair shop suffers difficulties as to precise judgments since no grounds on obvious signs exist as to various problems, such as poor ignition, engine trouble, transmission trouble, abruptly or continuously occurring in diverse vehicle circumstances such as the starting and driving of the vehicles and the like, so that most vehicle repairs are carried out based on mechanics' experiences due to difficulties as to precise judgments. Accordingly, different diagnoses are made among mechanics based on their experiences as to the same vehicle problem, and the cases that improper maintenances are carried out on the basis of their experiences exist all the time, which has a serious influence on vehicle safety as well as which causes various problems such as vehicle lifespan reduction, repair cost increase, distrust on vehicle sale companies, and so on.

In the meantime, in replacing vehicle consumables every certain period for enabling the maintenance of the optimal states of a vehicle, since a driver, at present, replaces the consumables either based on driver's incorrect knowledge on vehicle consumables replacements or by asking a mechanic one by one whether the consumables replacements are necessary whenever the driver visits repair shops, it is impossible to maintain optimal vehicle states, which causes the aforementioned various vehicle maintenance problems.

In order to provide some solutions to such problems, in conventional, an individual himself prepares a vehicle management note and records consumables replacements or repair contents in detail or some repair shops do the recordation and management for the vehicle management note for the purpose of recruiting customers. However, such methods are very inconvenient since a user, for the former case, writes maintenance and consumables replacement contents one by one as well as have high possibility for the contents to be missed due to user's mistakes and the like. Further, for the latter, more systematic managements are available than the former, but it is a problem that the user has to be a customer of one designated repair shop. In recent, lots of programs appear to manage materials in a form of the vehicle management note and to provide various additional services by using the internet as to vehicle consumables replacement periods, but, for this, a user has to input data one by one as in the above vehicle management note, and environmental restriction conditions exist that the user can use the program only when connectable on-line all the time.

In the meantime, with respect to vehicular convenience apparatus settings, in conventional, the vehicular convenience apparatus is adjusted by using only various mechanical devices, but, in recent, with introductions of various electronic systems within a vehicle such convenience apparatus settings and adjustments become convenient in a motor-driven manner using electronically controllable motors. However, in case that a vehicle is driven by more than one driver who have different physical conditions and sensitivities, each time one driver uses the vehicle after another, the driver should re-adjust all the convenience apparatus, such as driver's seat position, rear view mirror and room mirror angles, favorite radio frequencies, and so on, to be fit to himself, which causes inconvenience a lot.

DETAILED DESCRIPTION OF THE INVENTION

The present invention is to solve the above problems, and it is an object of the present to maximize drivers' convenience and differentiate products and services by enabling to systematically diagnose a vehicle and to maintain optimal convenience apparatus settings according to respective drivers.

In more detail, it is an object of the present invention to provide a system and a method enabling drivers to check vehicular consumables replacement periods and whether maintenance is required, take his vehicle to a repair shop when appropriate, and have the consumables replacements and maintenance performed out by collecting and storing output data of various mechanical and electronic devices such as sensors, engine control unit (ECU), transmission control unit (TCU), and the like, in use of a smartcard, enabling to diagnose vehicle problems on-line and off-line by using the stored data, analyzing the data and notifying the users of the analyzed results by executing independent programs on-line as to log data stored in the smartcard or by connecting to a server on-line.

Further, it is another object of the present invention to provide, in case of a repair shop, vehicle maintenance system and method enabling systematic and expert vehicle maintenance by reading on-line or off-line the log data stored in the smartcard as to various vehicle problems intermittently or continuously occurring and carrying out the maintenance based on the read data, to thereby enable systematic and integral vehicle diagnoses and managements by storing vehicle maintenance records and consumables replacement records in the smartcard.

Another object of the present invention, for vehicle sale companies, is to collect and database various vehicle maintenance-related data transferred on-line through the smartcard, grasp vehicle problems on sale, to thereby use the collected data as basic data for complementing the vehicles on sale and developing new vehicle models in the future.

It is a further object of the present invention to provide a method for providing a driver with more comfortable and convenient driving environments by allowing the driver to automatically set the driver's convenience apparatus when riding the vehicle in use of the smartcard.

In order to achieve the above objects, a system for collecting and diagnosing vehicle data comprises a smartcard having vehicle-related data consisting of basic vehicle information data and vehicle maintenance information data; and a smartcard control unit(SCU) connected to electronic control units, mechanical control units, and sensors within a vehicle, and for collecting vehicle information, reading the vehicle-related data from the smartcard, and storing the collected vehicle information in the smartcard. Preferably, the system further comprises a terminal for reading the vehicle-related data from the smartcard, carrying out diagnoses, and storing results in the smartcard.

The smartcard being used in the system of the present invention includes the basic vehicle information data indicating vehicle-inherent information data and information data as to an owner of the vehicle and the vehicle maintenance information data containing data indicating information outputted from various vehicular control units and sensors and data inputted from exterior as to vehicle diagnoses and maintenance.

Further, the smartcard control unit used in the system of the present invention includes a vehicle interface for inputting data as to vehicle states from the mechanical control units, electronic control units, and sensors inside the vehicle; a first memory for storing data indicating vehicle states collected from the control units and sensors through the vehicle interface; a second memory for storing data transferred from the smartcard as to vehicle diagnosis and maintenance items; a third memory for storing vehicle-inherent information data such as vehicle delivery date, frame number, engine number, vehicle kind, year, and displacement volume that are unchangeable items out of the basic vehicle information data; a fourth memory for storing the convenience apparatus setting values of a present driver; a card interface for interfacing the smartcard and the smartcard control unit; a processor for controlling the vehicle interface, first memory, second memory, third memory, fourth memory, and card interface, and carrying out calculations; and a ROM including a program for controlling the processor.

Further, the terminal used in the system of the present invention includes a card terminal for reading the vehicle-related data from the smartcard and storing processed vehicle-related data in the smartcard; and a personal computer (PC) for executing a vehicle diagnosis program as to the vehicle-related data read from the smartcard, diagnosing the vehicle, displaying maintenance items based on the diagnosis results and storing the results in the smartcard, or a mobile communication terminal connecting to a main server of a central A/S center through a network such as the internet, and receiving and outputting results which are processed in the main server of the central A/S center.

A method for collecting vehicle data in the system of the present invention comprises steps of transferring self diagnosis commands to the respective control units inside the vehicle and receiving responses to the self diagnosis commands; determining whether the received responses are normal ones and, if the received responses are not normal ones, storing the smartcard control unit error codes received as the responses; determining whether the smartcard is inserted and authenticating the inserted smartcard; storing in the authenticated smartcard the error codes stored in the smartcard control unit; and comparing the smartcard control unit data and the smartcard data and, if different, updating the data stored in the smartcard control unit and the smartcard.

In the meantime, a method for diagnosing the collected vehicle data off-line by using the smartcard in the system of the present invention comprises steps of executing a vehicle diagnosis program in a terminal; inserting the smartcard in the terminal and authenticating whether diagnosing the smartcard by the program is available; reading the vehicle-related data stored in the authenticated smartcard; executing the diagnosis program as to the read vehicle-related data and performing vehicle diagnoses; and displaying the diagnosis results on a user's terminal.

In the meantime, a method for diagnosing the collected vehicle data on-line by using the smartcard in the system of the present invention comprises steps of inserting the smartcard in a terminal; connecting the terminal to a main server of a central A/S center through a network and authenticating whether the smartcard is available for services by the main server of the central A/S center; transferring the collected vehicle-related data from the smartcard to the main server of the central A/S center if the smartcard is authenticated; diagnosing the vehicle as to the collected vehicle-related data and storing the diagnosis results; and transferring the diagnosis results to the terminal, displaying the results on the terminal, and recording the results in the smartcard.

BRIEF DESCRIPTION OF THE DRAWINGS

FIG. 2 is a block diagram for showing respectively the structures of data to be recorded and updated in the smartcard and in a smartcard control unit(SCU) according to an embodiment of the present invention.

DETAILED DESCRIPTION OF THE PRESENT INVENTION

Embodiment

Hereinafter, a preferred embodiment of the present invention will be described in detail with reference to the accompanying drawings.

Figure 1:
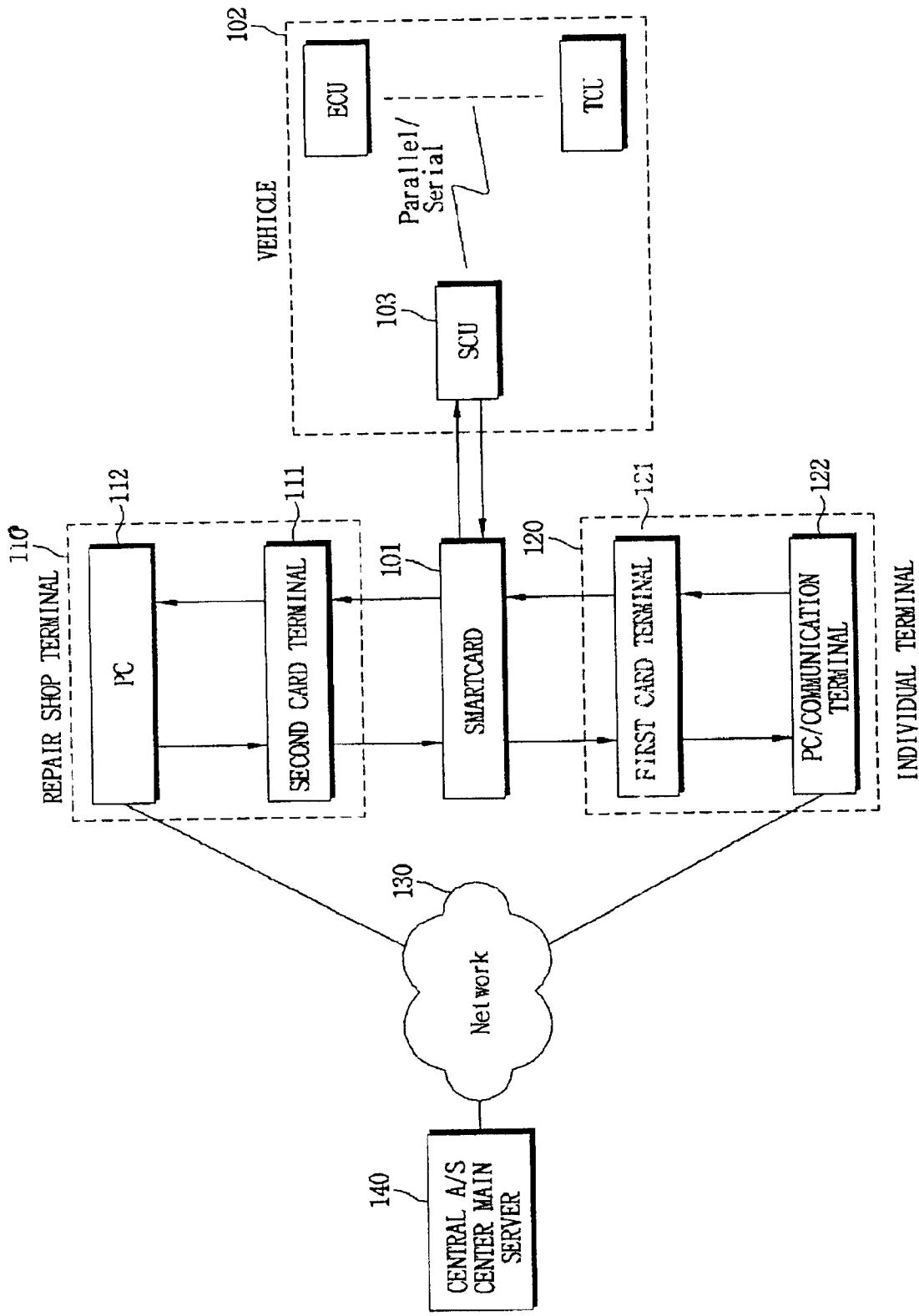
FIG. 1 is a schematic block diagram for showing a vehicle data collection and diagnosis system on-line and off-line by using a smartcard according to an embodiment of the present invention.
Figure 3:
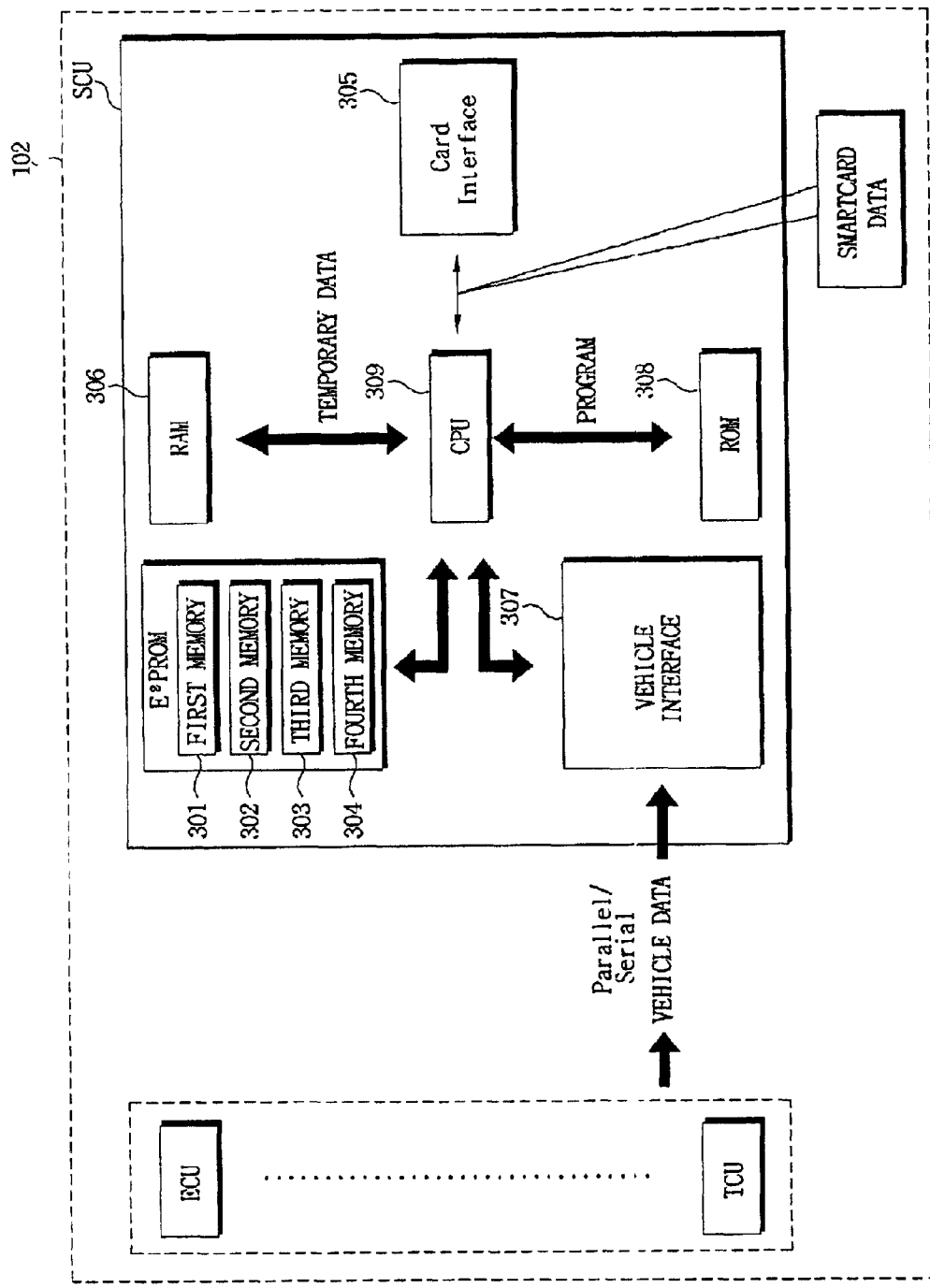
FIG. 3 is a detailed block diagram for showing the structure of the smartcard control unit of FIG. 1.

Now, the present invention is described with reference to FIG. 1 and FIG. 3. FIG. 1 is a schematic block diagram for showing an on-line and off-line vehicle data collection and diagnosis system by using a smartcard according to an embodiment of the present invention, and FIG. 3 is a detailed block diagram for showing the structure of the smartcard control unit of FIG. 1.

Referring to FIG. 1, a system for collecting vehicle data and diagnosing vehicles according to an embodiment of the present invention comprises (i) a smartcard control unit 103 mounted in a vehicle 102, (ii) a terminal 110 of a vehicle repair shop which includes a second card terminal 111 and a personal computer (PC) 112, (iii) a personal terminal 120 including a first card terminal 121 and a PC or a mobile telecommunication terminal 122, and (iv) a central A/S center main server 140 for receiving information on a vehicle 102 from the PC/communication terminal 112 and 122 mounted in the repair shop terminal 110 or the personal terminal 120 and transferring desired vehicle diagnosis and repair data back to the repair shop terminal 110 and the personal terminal 120 through a network 130, which transfer information to each other by means of a smartcard 101.

The vehicle 102 in FIG. 1 includes the smartcard control unit (SCU) 103 which collects and stores in the first internal memory 301 the latest information on sensors and control units mounted in various vehicular devices, the vehicular normal and abnormal states indicated as error codes, and vehicular changed details indicated as input values for vehicle speed sensors, injector driving signals, and so on, from the sensors and the control units by a method described later, collects and stores in the second internal memory 302 the latest vehicle maintenance information, and stores vehicular or driver's convenience apparatus setting values in the fourth memory 304. The control units such as TCU, ECU and the like and various sensors are connected to the SCU in parallel or serial so as to transfer to the SCU 103 and store in the first internal memory 301 data for all the details occurring in a vehicle such as whether or not electronic control units are in malfunction, replacement periods for various consumables, whether or not the engine is in malfunction, and so on, which are collected from the respective control units.

In the meantime, the repair shop terminal 110 in FIG. 1 includes the second card terminal 111 for reading from the smartcard and recording in the smartcard vehicle-related data, and the computer 112 connected to the second card terminal and for analyzing the data read from the smartcard, inputting and storing the details on whether or not a vehicle is in malfunction, consumables replacement state indications, and vehicle maintenance. Further, the personal terminal 120 in FIG. 1 includes the first card terminal 121 for reading and recording vehicle-related data from and into the smartcard, and the maintenance program-installed computer 122 connected to the first card terminal 121 and for indicating details on vehicle state diagnosis and maintenance recommendations off-line to enable self diagnosis, or the computer or communication terminal 122 connected to the first card terminal 121 and for transferring data from the smartcard 101 to a central A/S center through a network and indicating the details on vehicle diagnosis and maintenance recommendations on-line to enable self diagnosis.

In the meantime, the central A/S center main server 140 in FIG. 1 may be connected to the repair shop terminal 110 and/or the computer or communication terminal 122 of the personal terminal 120.

FIG. 2 is a block diagram for showing the structures of data to be recorded and updated in the smartcard and in a smartcard control unit (SCU) according to an embodiment of the present invention. First, information recorded in the smartcard is classified into basic vehicle information data, vehicle maintenance information data, driver convenience information data, joint application information data and other information data in which the basic vehicle information data is again divided into unchangeable items and updatable items, and the vehicle maintenance data into items updatable from the SCU and items updatable from external devices. Further, data stored in the SCU is divided into basic vehicle information data, vehicle maintenance data, driver convenience information data, and other information data in which only unchangeable items are stored in the basic vehicle information data, and the vehicle maintenance data is divided into items updatable from various control units and sensors and items updatable from the smartcard.

The unchangeable items of the basic vehicle information data indicates inherent vehicle information such as vehicle delivery date, frame number, engine number, kind of vehicle, year, displacement volume, and the like, which is information a vehicle maker stores in the third memory 303 of the SCU when shipping out a vehicle. The SCU data of these unchangeable item data is once writable upon initial settings but not updatable, and the same area of the smartcard only stores the information data of the SCU as it is, and after delivered from a factory, it does not allow the date to be changed by other external devices except by the SCU. Further, the updatable items of the basic vehicle information of the smartcard are information about a vehicle owner himself such as vehicle purchase date, vehicle purchaser, driver's license number, E-mail and the like, which can be registered through checking the identity of the owner in a designated establishments such as vehicle dealer shops and the like, and such items are recorded only in the smartcard rather than in the SCU.

The items, out of the vehicle maintenance information data, to be updated from various control units (CU) are information to be recorded in the SCU through detections from the various control units and sensors in a vehicle, which are inputted from self diagnosis connectors and include all the information detectable from sensors mounted in the vehicle, such as the vehicular normal and abnormal states indicated as vehicle error codes, vehicle speed on the running, average RPM obtained from injector driving signals, engine state information, and so on. Further, the information may be recorded in a history of changed records for a certain period of time such as engine's abnormal signals and the like or in a form of the final record updated such as mileage records and the like, according to characteristics, which is transferred to the smartcard, when the smartcard is inserted in the SCU, to update information data corresponding to the updatable items from the SCU.

In the meantime, of the vehicle maintenance information data, the items updatable from external devices, which is in the smartcard, include records regarding vehicle maintenance such as A/S dates, A/S items, maintenance contents, replaced parts, and maintenance shop records, which are recorded in the smartcard by external devices such as card terminals 111 and 121 of FIG. 1, and, in case that the smartcard is inserted in the SCU, the central processing unit of the SCU compares the data with the existing data stored in the SCU and mutually updates the smartcard and the SCU with the latest data.

The driver convenience data recorded in the smartcard 101 and the SCU 103 includes information data related to the convenience of individual drivers, such as favorite radio frequency selections, volume controls, audio-related information like CD or EQ setups, vehicle's cabin temperatures, side view mirror adjustments, driver's seat height and tilt, steering, wheel's position and tilt, and so on, and, in case of providing plural smartcards per vehicle, the driver convenience information data areas of smartcards store data fit to card holders respectively, by smartcard. Accordingly, in case that a driver gets in a vehicle and inserts his smartcard, the SCU transfers the convenience apparatus information in the smartcard to various control units in the vehicle so that the vehicular convenience apparatus is adjusted to be fit for the driver, and, in case that the driver adjusts convenience information-related devices during the driving, the adjusted information is first stored in the SCU memory and then the smartcard is updated. As a result, the driver convenience apparatus information data in the smartcard is recorded as data set for the convenience apparatus till a smartcard holder leaves the vehicle at last.

In the meantime, the smartcard may be loaded with applications of companies individually contracted with a driver to provide services such as emergency medical care information, insurance company's vehicle insurance records, gas points accumulation of oil refining, companies, theaters, shopping, travels, various mileages, and so on, as joint application information data, in addition to vehicle-related information, so that the smartcard may store information enabling a multi-function card having multiple functions as a single card.

The aforementioned smartcard data is initialized by resetting the SCU upon the initial use or upon user's necessity. The initialization updates the smartcard with the SCU data, and, at this time, of the basic vehicle information data, the unchangeable items, vehicle maintenance information data, and driver convenience information data are updated from the SCU data, and, of the basic vehicle information data, the updatable items, joint application items, and other information data remain as they are if the existing data is stored in the smartcard.

Such initialization is particularly necessary when selling and purchasing a vehicle, and in case that a existing smartcard holder purchases a vehicle, the holder, for the purpose of the smartcard use, inserts the existing smartcard in the SCU and resets the SCU to initialize the smartcard and when a purchaser who does not use a smartcard takes over a SCU-mounted vehicle, he purchases a new smartcard separately, inserts the new smartcard into SCU, resets SCU to initialize the card, and use the card, in which the same process is applied when the existing smartcard user lost his smartcard.

Hereinafter, referring to FIG. 3 and FIG. 4, descriptions are made on an SCU structure and a process for collecting information from various sensors mounted in a vehicle.

The smartcard control unit 103 shown in FIG. 3 includes the vehicle interface 307 connected to various control units and sensors in a vehicle for inputting data from the same; in EEPROM comprising the first memory 301 for storing information transferred through the vehicle interface 307, the second memory 302 for storing data, such as maintenance information and the like, transferred from the smartcard, the third memory 304 for storing inherent vehicle information upon vehicle delivery, and the fourth memory 304 for storing convenience apparatus setting information of a present driver; a RAM 306 for temporarily storing vehicular internal information or data to be updated from the smartcard which is collected before storing information in the first, second, and fourth memories; a card interface 305 for interfacing with the smartcard; a CPU 309 for controlling the above constituents and performing calculations; and a RAM 308 for storing programs for controlling the CPU 309.

Further, the SCU according to an embodiment of the present invention may be designed to include external indicators for characters, images and voices which enable vehicle check-ups by indicating the present state of the SCU, indicating communication states during updating information between the smartcard and the SCU, or indicating message regarding vehicle troubles when it is judged that there are trouble inside the SCU and abnormal signs from control units in the existing vehicle, and the indicators may be implemented through display devices such as audio displays mounted in a vehicle, a navigator (navigation system), AUTO PC, and the like, or embodied in association with the display devices.

Figure 4:
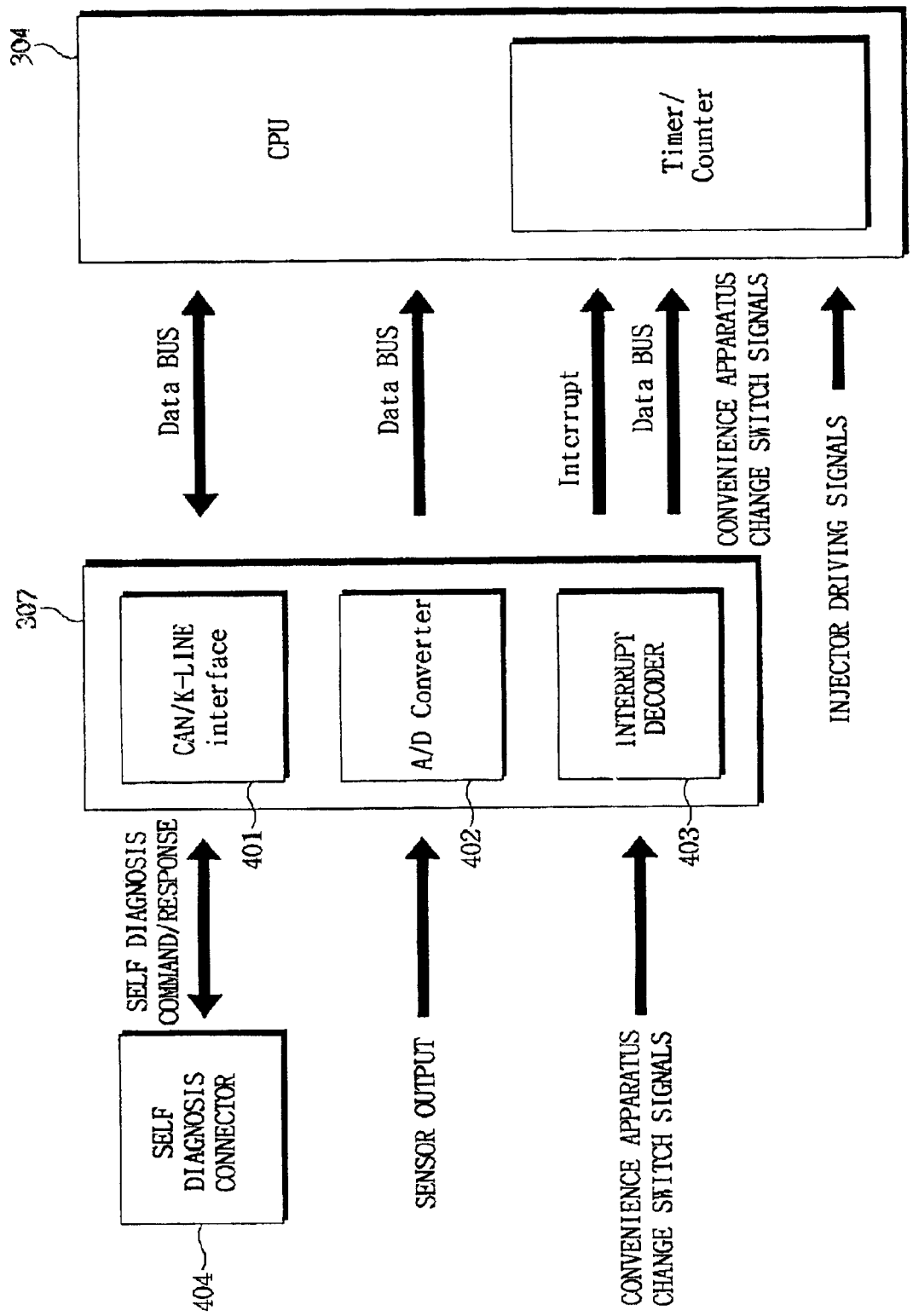
FIG. 4 is a detailed block diagram for showing the structures of a CPU and a vehicle interface inside the SCU according to an embodiment of the present invention.

Describing the vehicle interface used for communications between the SCU of FIG. 4 and respective parts of a vehicle, the vehicle interface 307 includes interfaces 401 such as CAN/K-Line and the like for connecting various self diagnosis connectors with the SCU, sensor interfaces such as AID converter 402 for transferring output values of various vehicle sensors to the SCU, and an interrupt decoder 403 for decoding interrupts for changing convenience apparatus setting values stored in the SCU by recognizing the changed convenience apparatus settings during running. Hereinafter, a more detailed description on each of the same will be carried out.

The SCU communicates to the self diagnosis connectors for collecting information on various vehicular control units such as the ECU, TCU, ABS control units, AIR BAG control unit, and so on, through the interfaces such as CAN BUS, K-Lines, and so on, of the vehicle interface 307. For the vehicle diagnosis, the self diagnosis connectors 404 are physical connectors positioned in the ECU, in the engine room, or adjacent the driver's seat and connected to vehicular diagnosis equipment such as a high-resolution scanning device in the existing repair ship and for grasping basic vehicle states, and protocols for the K-Line, CAN type, and so on as interfaces for reading in error codes of various control units from the connectors are so known as the international standards (ISO) and industrial standards that detailed descriptions are omitted. Further, error codes occurring as responses to requesting data from the ECU and the like by using these protocols and error codes interpretations may be obtained from each vehicle maker.

Figure 5:
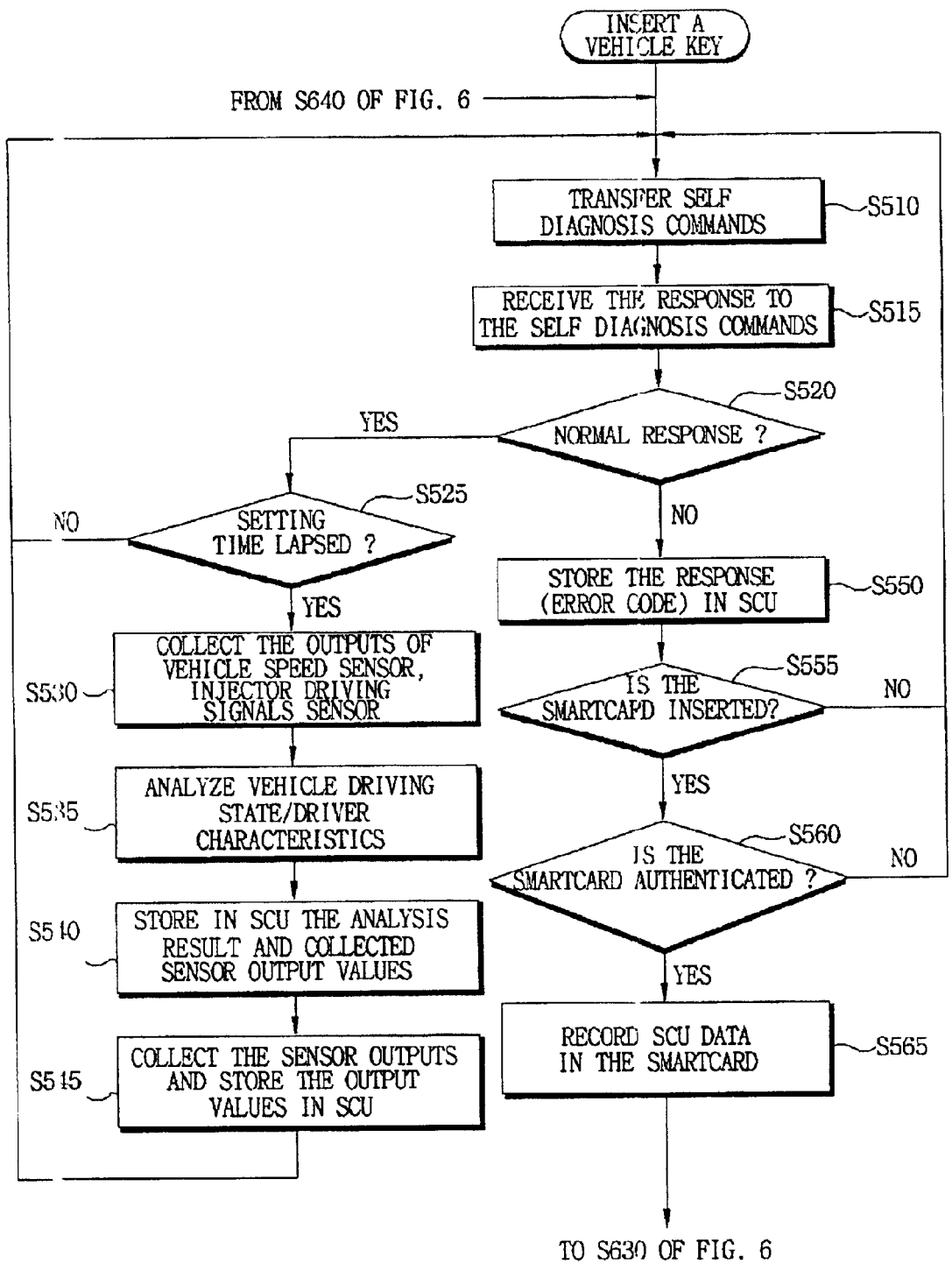
FIG. 5 is a flow chart for illustrating a process for collecting vehicle data in a system according to an embodiment of the present invention.

Further, the CPU 309 requests data for such vehicular error code items to the vehicular control units through vehicle interface 307, reads in and interprets a response for each item through the vehicle interface 307, and, if the response value for the corresponding item is not a normal value, stores the value in the first memory 301 while transferring to the smartcard in a manner to be described in FIG. 5 and storing the value.

In the meantime, outputs of various sensors, such as vehicle speed sensors, injector driving signals, throttle valve position sensors (TPS), air volume sensors, temperature sensors (water temperature, exhaust gas, etc.), intake air sensors (MAP Sensor, Airflow Sensor, Kalman vortex sensor, etc.), and so on, for diagnosing problems detected from vehicle sensors and collecting vehicle operation information and driver's driving characteristics information, and battery voltage inputs for checking battery voltage states are converted in the sensor interfaces, with current outputs or voltage outputs from vehicle sensors as inputs, typically implemented in a form of the A/D converter 402, and the conversions are transferred to the CPU 309 for detections.

The CPU 309 performs calculations for the present vehicle operation states and driver's driving characteristics obtainable from the output values of the aforementioned various sensors (in such a manner as vehicular average speed, highest speed, lowest speed, vehicular average RPM, highest RPM, lowest RPM, and so on) and stores the resultant values in the memory of the SCU, determines that the various outputs have been changed in designated output ranges in accordance with such vehicular operation states, and, when the values diverge from the designated output ranges, stores the values in the memory of the SCU. The vehicular sensor output information stored in the SCU is transferred to the smartcard in such a manner as described in FIG. 5 later, and transferred to the main server 140 of the central A/S center described later or to an off-line independent program through the smartcard, to be used for indications as to sensors' normal and abnormal states, maintenance items related to consumables replacements based on users' driving characteristics, and so on.

Further, the vehicular interface 307 decodes signals occurring when a driver changes the settings of the vehicular convenience apparatus during driving and notifies the CPU of which convenience apparatus setting is changed, and, according to vehicles, inputs information on power mirror adjustment switches connected in a manner of the LAN, CAN or direct connections, seat adjustment switches, car audio users provided through the CDI interface and the like, and so on, transfers the data to the CPU to be stored in the smartcard, or plays a communication interface apparatus role that can read in the user convenience apparatus setting values transferred from the smartcard through the CPU, control driving devices such as motors attached to respective user convenience apparatus, and re-set the convenience apparatus.

A method for collecting vehicular internal data by use of the SCU having the aforementioned structure will be described hereinafter with reference to a flow chart of FIG. 5 showing a process for collecting vehicular internal data by the system of the present invention.

In the system of the present invention, the SCU 103 mounted in a vehicle is connected with various control units and sensors in the vehicle and detects changes occurring in all parts through the vehicular control units and sensors from the moment that electric power is applied with a vehicle key insertion after a driver get in the vehicle. If a driver gets in a vehicle and electric power is supplied to the SCU with the insertion of a vehicle key, the CPU 309 transfers self diagnosis commands to various vehicular control units through the CAN/K-Line in the vehicular interface 307 by using the self diagnosis connectors 404(S510). Thereafter, the various control units reply to the transfers and transfer the error codes of respective control units to the CPU 309 through the CAN/K-Line, and the CPU receives the error codes(S515). The CPU 309 analyzes the received error codes and determines whether the respective control units and all the respective vehicular parts that the control units controls are normally operating(S520). If it is determined that all the parts are normally operating, the SCU determines whether setting times lapse in order to check sensor output values(S525). The time period for checking such sensor output values may be diversely set based on the operation capability of the CPU of the SCU, and such setting values are counted by a Timer/Counter of the CPU 309.

If the setting time does not lapse, the SCU proceeds to the step(S510) and again transfers self diagnosis commands to the respective control units, and, if the setting time has lapsed, the SCU inputs the sensor output values of the vehicle such as inputting a vehicle speed through a vehicle speed sensor, inputting an RPM as an injector driving signal, and so on, and stores temporarily the output values in the RAM 306 of the SCU. By using the sensor output values temporarily stored, the present vehicular running states and driver's driving characteristics are analyzed in the CPU 309 through the algorithmic operations for calculations of a vehicular average speed, highest speed, lowest speed, vehicular average RPM, and highest and lowest RPM (S535), and such analyzed results are stored in the first memory 301 of the SCU together with the sensor output values collected in the step S530(S540). After the collection and analysis of the sensor output values, described above, the SCU again proceeds to the step S510 and transfers the self diagnosis commands to the vehicular control units.

As an analysis result of error codes received as responses to the self diagnosis commands, if determined as abnormal responses, such error codes is stored in the first memory 301 of the SCU(S550).

The SCU, after storing the error codes, determines whether the smartcard is inserted in the SCU(S555). If the smartcard is not inserted, the step S510 again proceeds for transferring the self diagnosis commands since the smartcard can not be updated with the error codes, the sensor output values and analysis results stored in the SCU in the step S540, and, if the smartcard is inserted, an authentication step S560 proceeds for determining that the smartcard belongs to the present vehicle. The smartcard authentication is carried out through the comparisons of both of a smartcard key and a SCU key in which the key used for the authentication may be generated by using a vehicular inherent number such as vehicle frame number, engine block number, or the like. If it is authenticated that the smartcard can be used for the present vehicle, as stated above, the data stored in the SCU is recorded in the smartcard without any comparisons of the stored information data in the smartcard and the SCU since the stored data is the latest(S565). After recording the changed data in the smartcard, for the case that a smartcard inserted at present is replaced with a different smartcard from the smartcard inserted just after the vehicle key insertion or that a smartcard is inserted after the vehicle key insertion, a step S630 in FIG. 6 proceeds to update the data in both of the smartcard and the SCU with the latest data.

Figure 6:
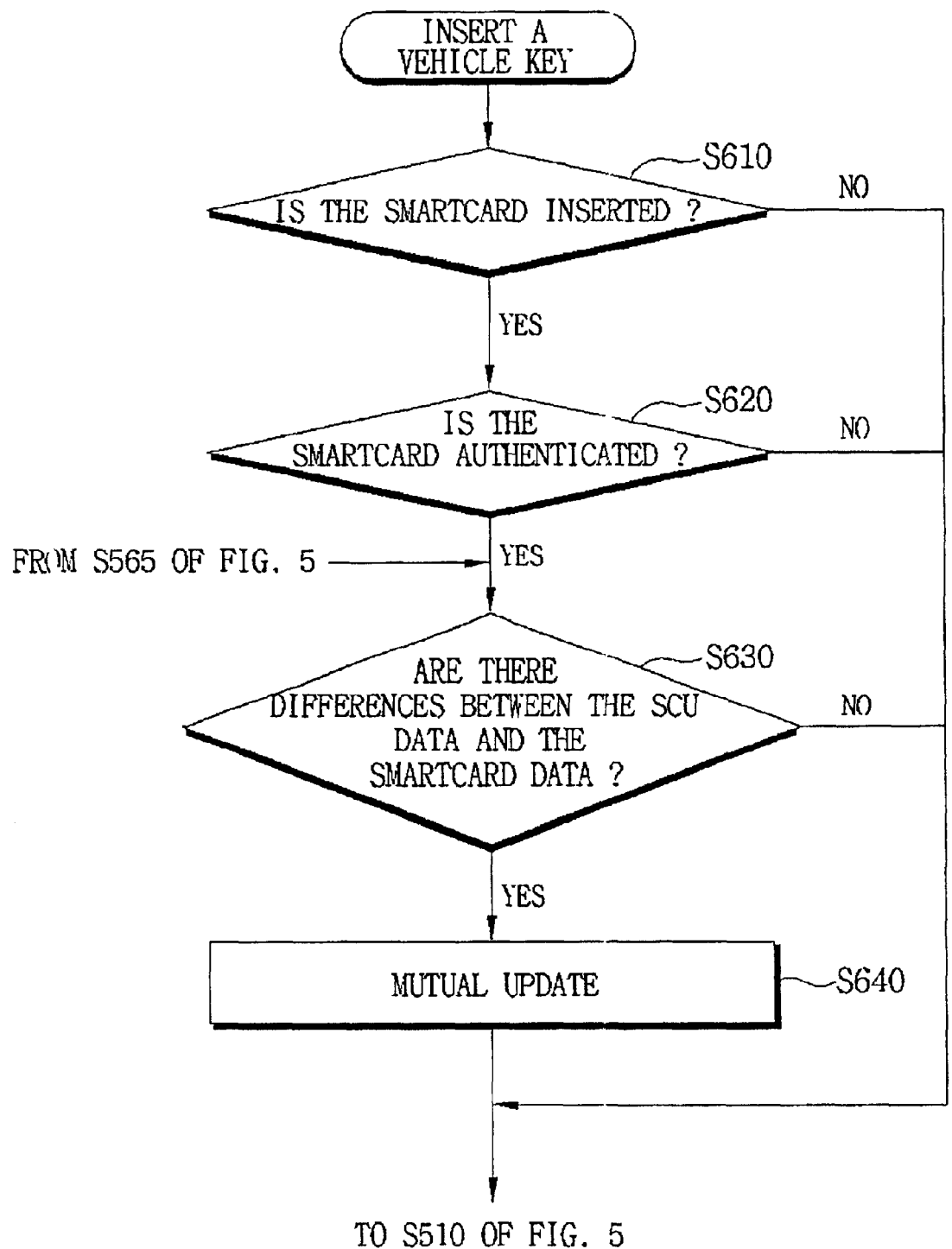
FIG. 6 is a flow chart for illustrating a process for updating data to the latest between the smartcard and the SCU in the system according to an embodiment of the present invention.

FIG. 6 is a flow chart for illustrating a process for updating data to the latest between the smartcard 101 and the SCU 103 in the system according to an embodiment of the present invention.

If a vehicle key is inserted in FIG. 6, the SCU determines whether the smartcard is inserted(S610). If the smartcard is not inserted, the SCU can not update data through the comparisons with the smartcard, so that step S510 proceeds for transferring the self diagnosis commands to detect the latest data of the vehicle, and, if the smartcard is inserted, a step S620 proceeds for authenticating the inserted smartcard. The step for authenticating the smartcard for whether the smartcard belongs to the present vehicle, as in FIG. 5, is carried out by comparing the smartcard key and the SCU key generated by using the vehicular inherent number such as frame number or engine block number. If the smartcard is not authenticated as a card suitable for the present vehicle, as in the case that the card is not inserted, the step S510 for detecting the latest vehicle data proceeds, and, if the smartcard is authenticated as a card suitable for the present vehicle, a step S630 proceeds for comparing the SCU data and the smartcard data to each other. The step for comparing the data to each other can be carried out by determining whether differences exist through the comparisons between the all the data stored in the smartcard and all the data stored in the SCU, but, more preferably, the comparisons in the step S630 can be carried out by comparing the magnitudes of numeric values such as date updated at the latest, mileage, accumulation number of times for updates, and the like, to thereby update old data with data updated at the latest (S640). At this time, the data to be updated to the SCU from the smartcard is the latest vehicle maintenance records stored in the smartcard through a method explained in FIG. 1 and FIG. 7 to be described later, and the data to be updated to the smartcard from the SCU is the latest vehicle data such as error code values, sensor output values, and so on, stored in the SCU by a method described in FIG. 5.

Figure 7:
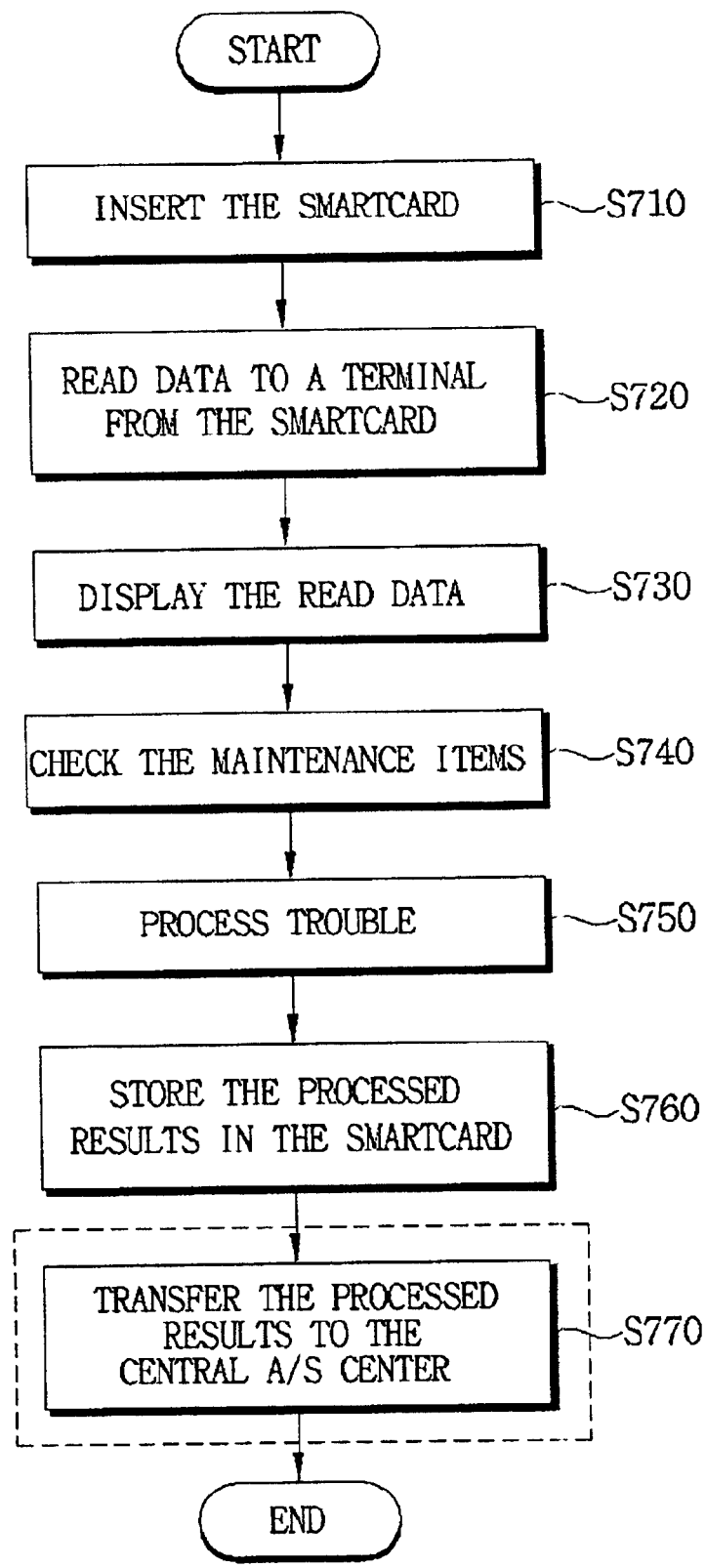
FIG. 7 is a flow chart for illustrating a process for vehicle diagnosis and repairs in a terminal in a vehicle repair shop.

FIG. 7 is a flow chart for illustrating a process for vehicle diagnosis and repairs through a PC or a independent terminal in a vehicle repair shop. When a vehicle is garaged in various kinds of vehicle repair shops providing joint services, a driver inserts the smartcard 101 belonging to the vehicle into the second card terminal 111 attached the PC or the independent terminal in an vehicle repair shop(S710). The inserted smartcard is detected by the vehicular control units and sensors through the steps described in FIG. 5 and FIG. 6, and all the data recorded and stored in the SCU 103 and the smartcard is read from the smartcard 101 to the second card terminal 111(S720). The read data is displayed on the PC 112 connected to the card terminal 111(S730), and maintenance items are checked through a diagnosis program or mechanic's experiences based on the read data(S740), and, at this time, in case that the maintenance items are checked by the maintenance program, the number of the maintenance items may be determined according to the capacity of the program. The mechanic replaces consumables or repairs the vehicle based on the checked items (S750), inputs the items to be worked out into the PC 112, and, if completely worked out, records the worked-out results into the smartcard 101 through the card terminal 111(S760). The latest maintenance data recorded in the smartcard is updated to the SCU through a process described in FIG. 6 as in the case that a driver inserts the smartcard in the SCU 103 of the vehicle, so that the latest maintenance data can be maintained in the SCU all the time.

If on-line environments are built up as in the case that the various kinds of repair shops providing joint services has an internet-accessible terminal, the terminal transfers to the central vehicle A/S center main server 140 the data updated for customer managements to store in a database the kind of vehicle, year, A/S date, A/S items, maintenance contents, repair shop records, and so on, and the main server 140 can receive and database the vehicle diagnosis data detected by the vehicular control units, sensors, and so on, and stored in the SCU. The data so collected is utilized as statistics data for vehicular pre-diagnosis services and for vehicle parts improvements and new vehicle developments.

If a vehicle owner drops by at a shop providing repair services without the smartcard, the data in the SCU 103 is used since the latest maintenance data is stored in the SCU 103 according to the above process. In this case, if the smartcard (maintenance-purpose, smartcard) the repair shop keeps, is inserted in the SCU and a reset key pressed, as stated above, the basic vehicle information data of the SCU and the vehicle maintenance-related data are stored in the smartcard. The smartcard is inserted back in the card terminal and the aforementioned maintenance service is performed, and the results of which are stored in the SCU through the same smartcard.

Figure 8:
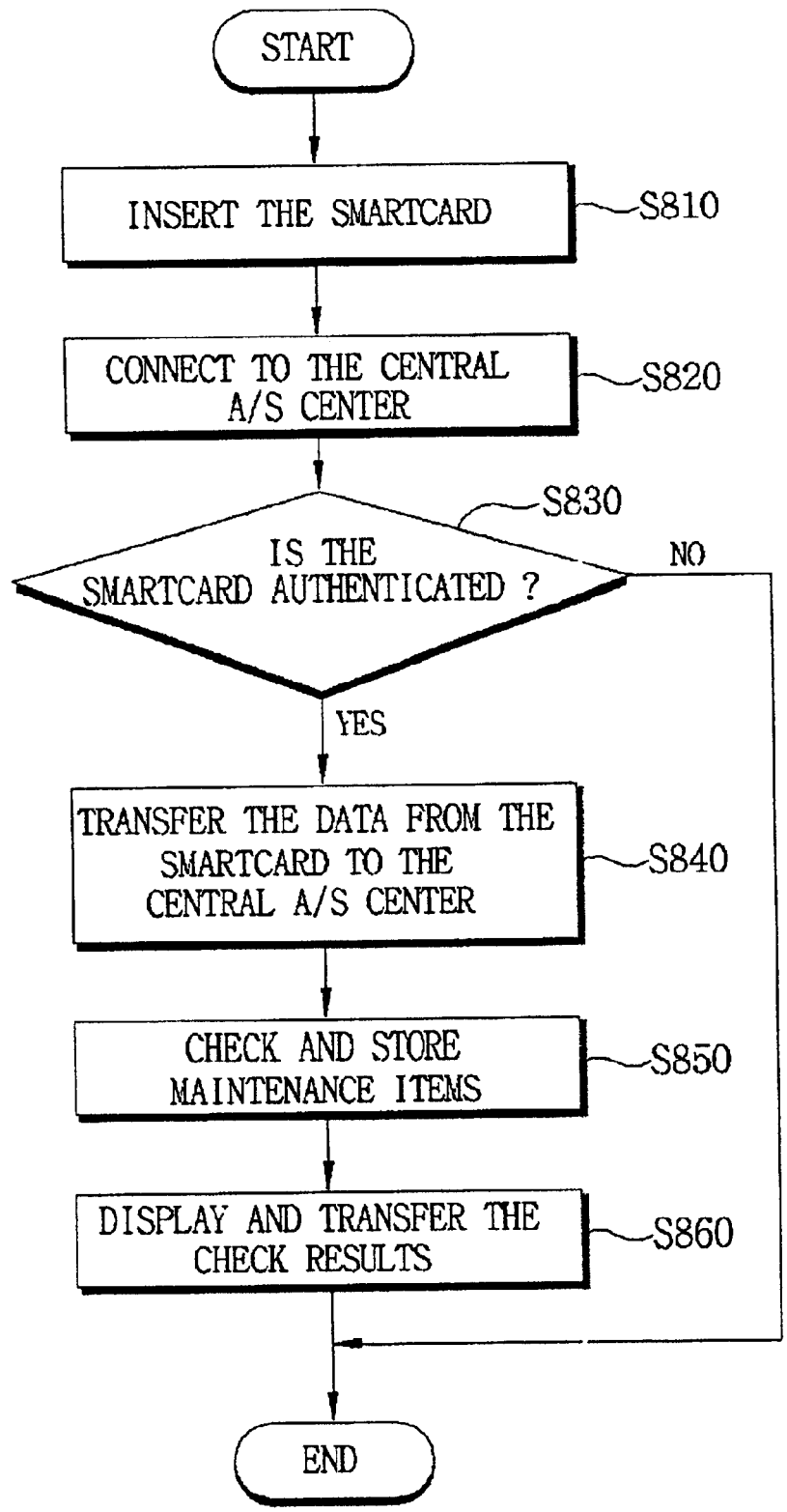
FIG. 8 is a flow chart for illustrating an on-line vehicle diagnosis process by using the smartcard.
Figure 9:
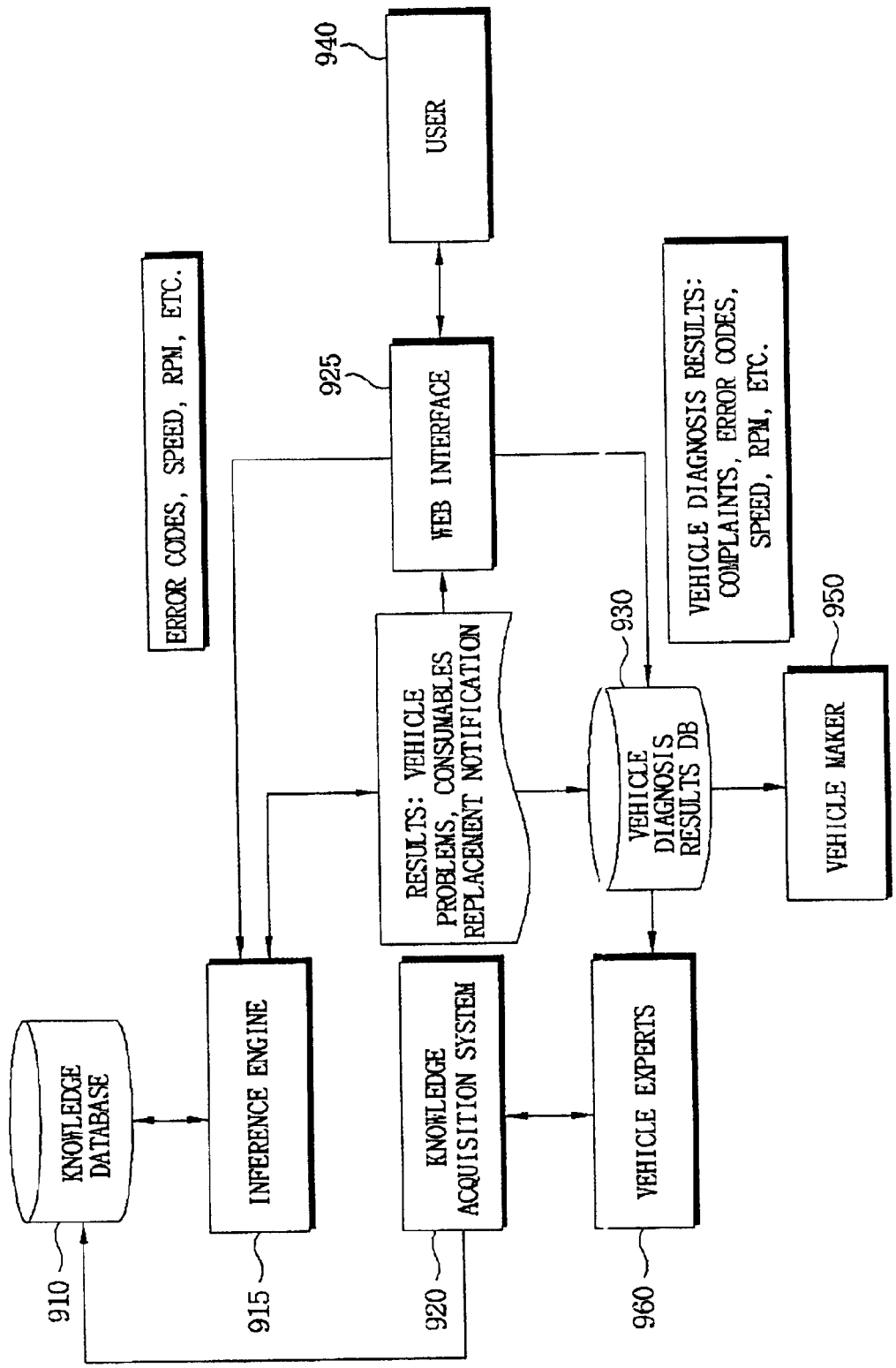
FIG. 9 is a block diagram for showing a structure of an on-line vehicle diagnosis system by using the smartcard.
Figure 10:
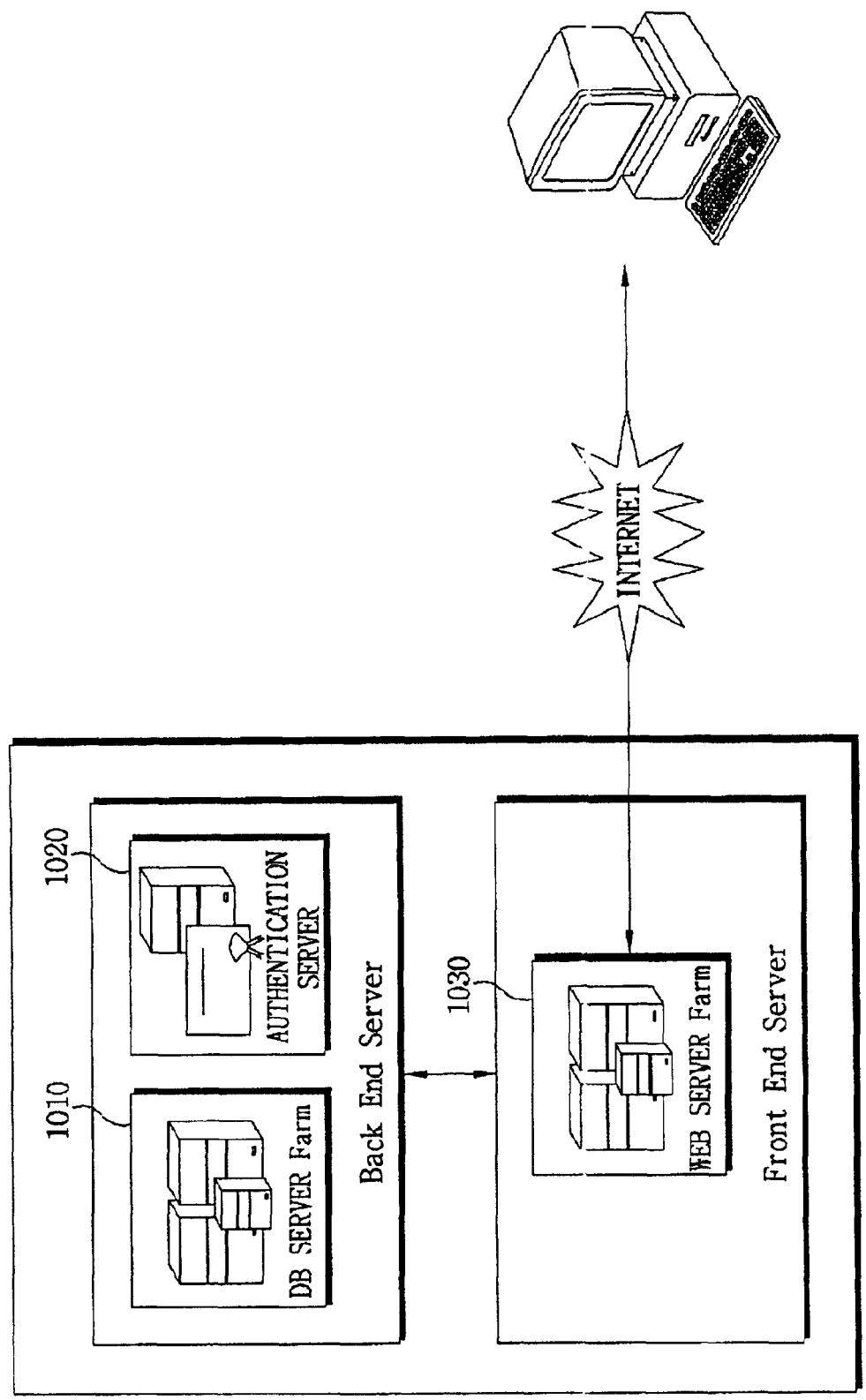
FIG. 10 is a block diagram for showing a central A/S center system.

Hereinafter, FIG. 8 showing a flow of a process for diagnosing a vehicle on-line by using the smartcard, and FIG. 9 and FIG. 10 showing on-line vehicle diagnosis system structures will be described. When a user wants to know problems occurred to a driving vehicle, the present states of the vehicle, or the like, the user inserts a smartcard belonging to his vehicle in various on-line access devices, such as computer, mobile phone, or the like(S810), in which the card terminal 121 is attached, and connects to the central A/S center main server 140 through a network such as the internet(S820).

First, the user connects, through a network, to a web server 1030 of a central A/S center implementing a web interface 925 wherein the web server uses a method of XML, HTML, or the like and has the capacity enabling to display multi-dimensional data and various multimedia information on the basis of graphic environments on the web and enabling the user to check the data input and process results therefrom. Once the web server 1030 is connected, an authentication server 1020 authenticates whether the connected smartcard is a card entitled to services, and, at this time, the authentication process is to compare and check vehicular inherent information, such as vehicle maker, kind of vehicle, year, or the like, stored in the aforementioned smartcard, and then to authenticate whether the vehicle is a vehicle for which the central A/S center main server 140 provides services(S830). If the smartcard is not authenticated as a card for which services can not be provided by the connected central A/S center main server 140, the on-line vehicular diagnosis process comes to an end. If the smartcard is authenticated by the authentication server 1020, the basic vehicular information data and maintenance information data updated in the smartcard through a process described in FIG. 5 and FIG. 6 are transferred to the central A/S center main server on-line(S840).

The central A/S center main server 140 having received the data performs a maintenance program in a database server 1010, detects error codes from the vehicular control units based on the received data, and stores the diagnosed results in a vehicle diagnosis result database 930(S850). In more details, first, if data, such as error codes inputted from the smartcard and the like, is collected, an inference engine 915 inputs the data and extracts knowledge from experts as to a vehicle in a form of a single error code or combined error codes occurrable as to vehicle trouble states or in an expertise form, builds the knowledge by using a knowledge acquisition system 920 converting the knowledge into a form storable in a knowledge base 910, and draws out proper solutions through various inference methods from the knowledge base 910 consisting of materials of trouble diagnosis rule, procedures, and the like. The solutions are materials as to vehicle problems and solutions to the problems, parts to be replaced, various statistics data related to driver's driving habits, and improvement directions, and displayed through a computer monitor in case that a device connected to the central A/S center main server through the network is a computer or through transfers by way of a method such as a text service and the like in case the connected device is a communication terminal such as a mobile phone(S860).

In the meantime, together with the results diagnosed and displayed through the above procedures, the user 940 may store in the vehicle diagnosis result database 930 complaints as to the vehicle diagnosis results or vehicle problems through the web interface 925, so that a vehicle maker 950 may use data stored in the database 930 and grasp drivers' preferences by vehicle, control unit problems by vehicle, and the like, and vehicle experts may update the knowledge base through the knowledge acquisition system 920 in order for the vehicle diagnosis results to become more precise through the inference engine. By such procedures, a vehicle user gets to know required maintenance items without driving directly to a repair shop, and, a vehicle maker can grasp vehicle problems, consumers' complaints, and the like, as to vehicles sold without checking the sold vehicles one by one, through the database 930.

Figure 11:
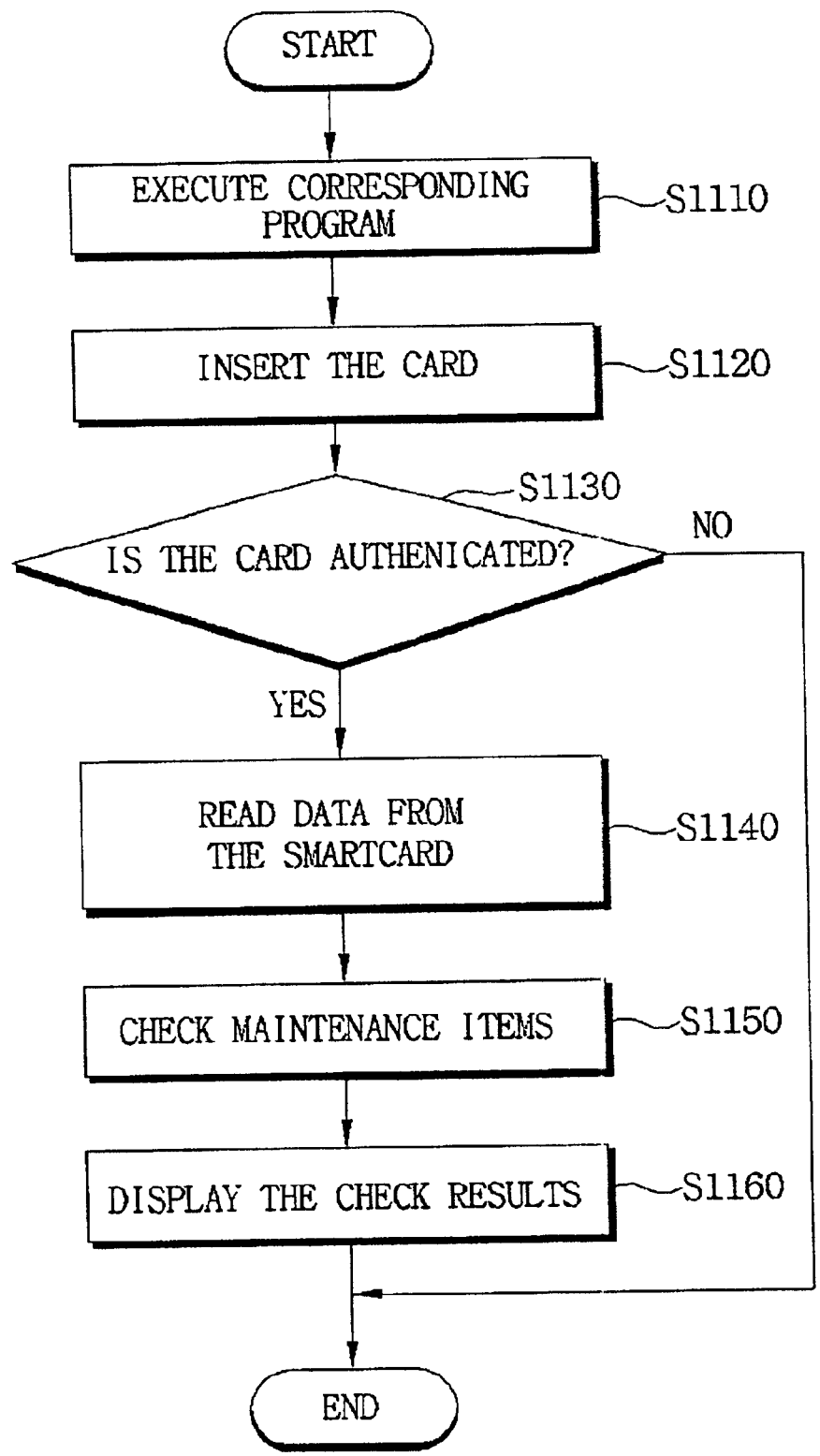
FIG. 11 is a flow chart for illustrating an off-line vehicle diagnosis process by using the smartcard.
Figure 12:
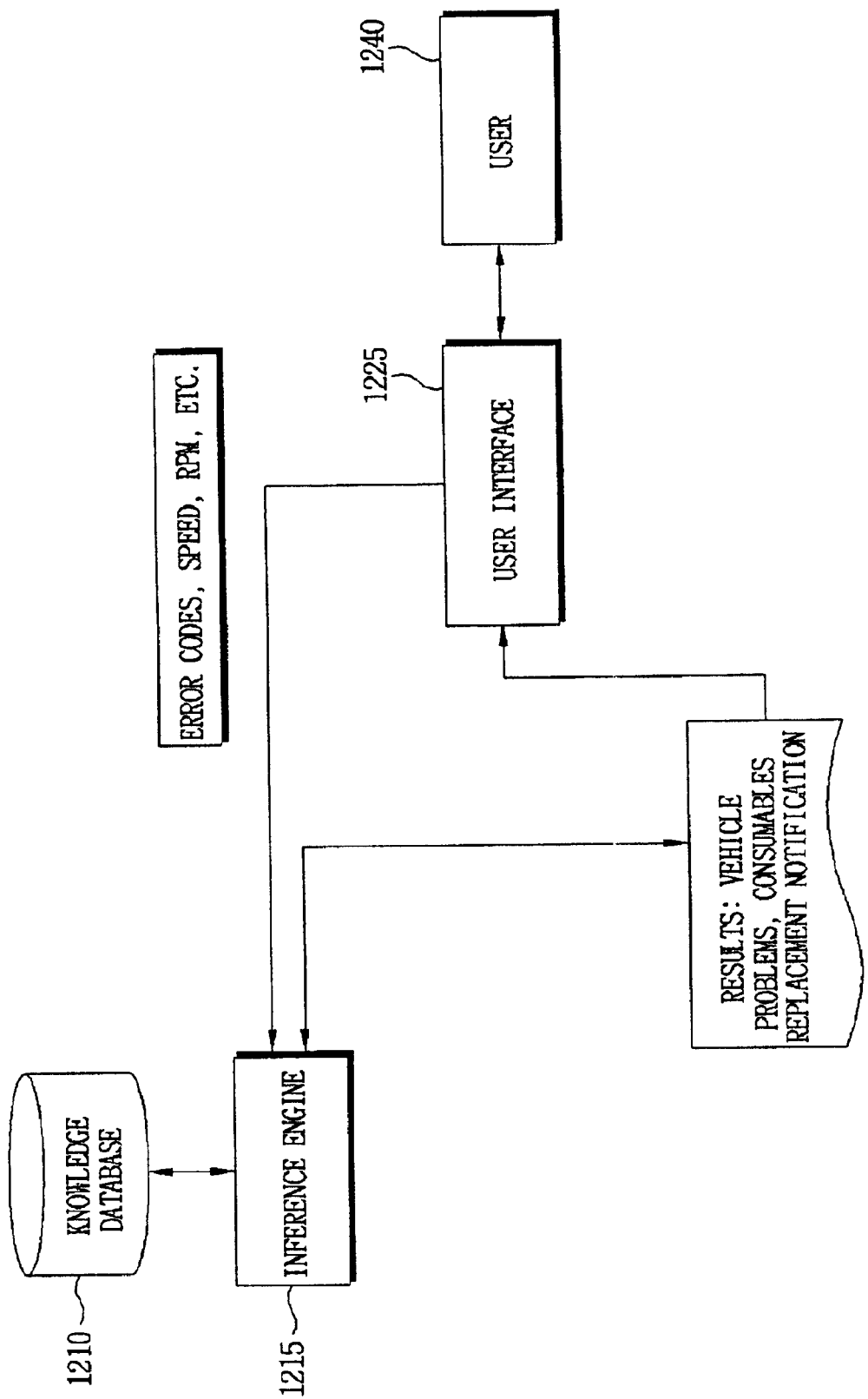
FIG. 12 is a block diagram for showing a structure of an off-line vehicle diagnosis system by using the smartcard.

With reference to FIG. 11 showing a flow of an off-line vehicle diagnosis process by using the smartcard and to FIG. 12 showing a system structure for FIG. 11, an off-line vehicle diagnosis process will be described. In case that a vehicle driver can not connect to the central A/S center main server 140 on-line, he or she can perform an off-line self diagnosis by using an independent device such as the PC 122 connected to the card terminal 121. First, a user executes a corresponding maintenance diagnosis program in an independent device such as the PC, and, at this time, the diverse program to be executed may be selected according to the process capacity and the number of maintenance diagnosis items of the independent device(S1110). After a diagnosis program is executed, the user inserts the smartcard in the card terminal 121(S920), the independent device authenticates whether the smartcard is entitled to receive the diagnosis service through the executing program at present, and the process of the authentication is the same as in FIG. 8(S1130). If the inserted smartcard 101 is not authenticated with a determination as a card that can not be served through the presently executing program, the off-line maintenance diagnosis process comes to an end, but, if the card is authenticated, data regarding inherent information and maintenance information such as error codes and sensor output values collected from a vehicle is read and transferred from the smartcard to the independent device by the card terminal(S1140). The independent device executes a diagnosis program as to the data transferred, carries out pre-diagnosis or problem diagnosis, and checks maintenance recommendation items or presently required maintenance items through the program(S1150).

Describing the aforementioned process in more detail, a user connects to an inference engine 1215 through a user interface 1225 performing the same functions as those of the web interface 925 of FIG. 9. That is, the error codes, sensor outputs, and maintenance information read from the smartcard by the card terminal 121 and collected from a vehicle are transferred to a software-implemented inference engine 1215 through a user interface, and the inference engine applies the vehicle diagnosis rules and diagnosis determination procedures provided from the knowledge base 1210 to the data received from the smartcard, analyzes error codes by using various inference methods, and diagnoses vehicle problems. The knowledge base in such an off-line vehicle diagnosis method is updated by purchasing a material-updated CD or an upgraded diagnosis program.

The vehicle problems, consumables replacement schedule, and the like, as the results checked through the above method are displayed on the independent device (S1160). As in the on-line vehicle diagnosis, required maintenance items can be obtained without dropping off a vehicle in a repair shop directly through such an off-line vehicle diagnosis process.

Figure 13A:
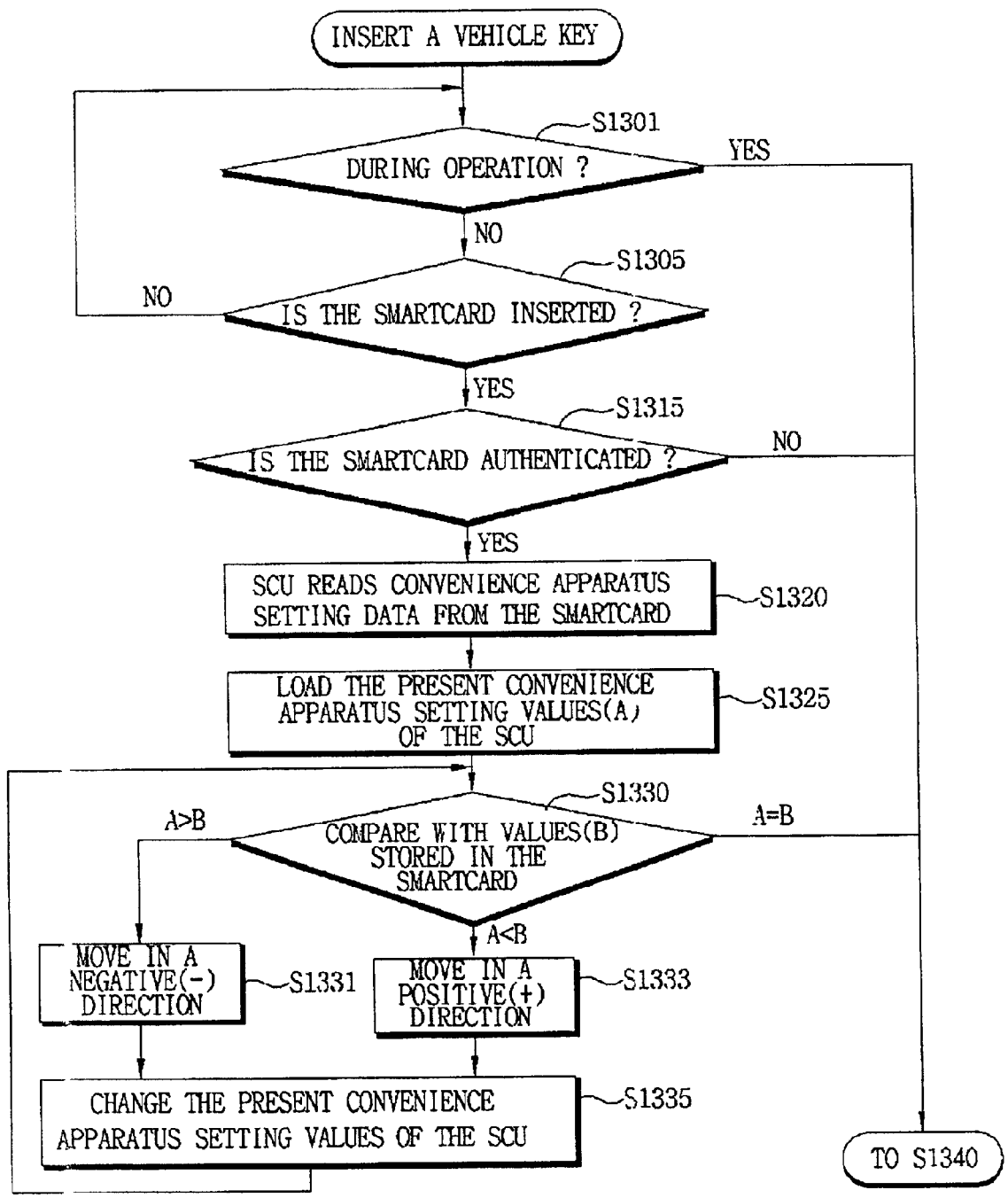
FIGS. 13a and 13b are flow charts for illustrating a process for automatically setting the vehicular convenience apparatus based on data stored in the smartcard according to an embodiment of the present invention.
Figure 13B:
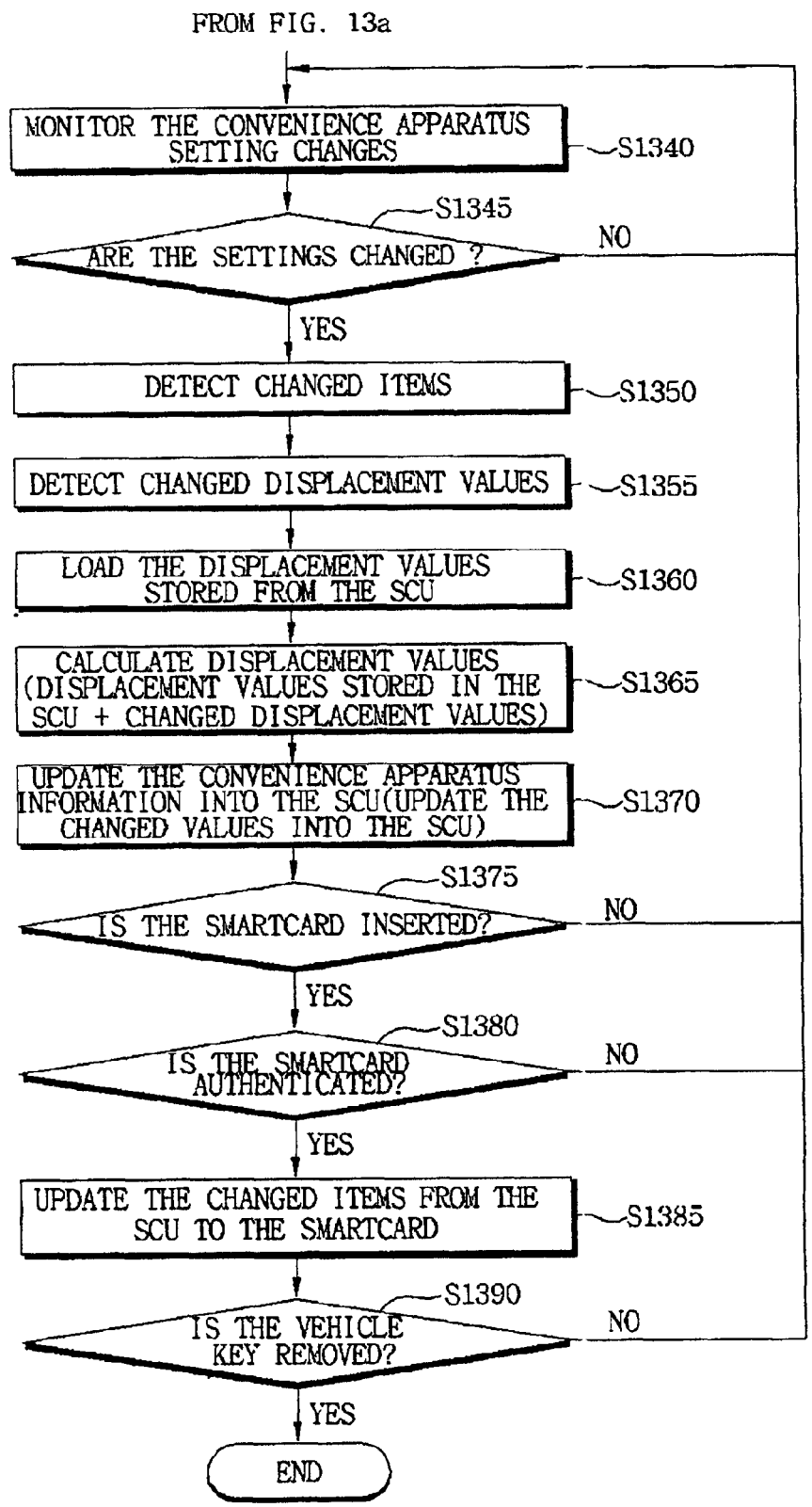

Hereinafter, referring to FIG. 13a and FIG. 13b, a method for automatically setting a vehicular convenience apparatus by using the smartcard will be described. FIG. 13a and FIG. 13b show a method for automatically setting the vehicular convenience apparatus based on data stored in the smartcard according to the present invention. In order to automatically set the vehicular convenience apparatus by using the data of the smartcard 101, it must be a prerequisite that a vehicle is not in operation for the sake of driver's safety. Accordingly, if a driver gets in a vehicle and inserts a key for electric power to switch on, the central control unit of the vehicle first checks if the vehicle is in operation(S1301). If the vehicle operates, for safety' sakes, it is not determined whether or not a smartcard is inserted but a step(S1340) for determining whether the existing convenience apparatus is changed proceeds to avoid changing the convenience apparatus by reading convenience apparatus setting data from the smartcard.

If the vehicle is not in operation, the vehicular central control unit first checks if the smartcard 101 is inserted in the SCU 103, in order to read the convenience information from the smartcard(S1305). If a vehicle key is inserted and the smartcard is not inserted in the ion-operation state, the central control unit repeats the steps S1301 and S1305 until vehicular changes occur by the driver, but if the smartcard is inserted in the non-operation state, the central control unit proceeds to a step for authenticating the inserted smartcard. The smartcard authentication step compares the card key and the SCU key to each other, and, in this case, the authentication key may be, as in steps of FIG. 5 and FIG. 6, generated by using a vehicular inherent number such as vehicular frame number, engine block, and so on. Data from the smartcard can not be read in case that an authentication is not made since the smartcard does not belong to a vehicle, so the central control unit proceeds to a step S1340 for checking if previous convenience apparatus settings are changed. In case that the smartcard 101 is authenticated, the SCU 103 reads convenience apparatus-related data and stores it in the RAM 306 which is a temporary storage location in the SCU 103, and, at this time, the read convenience apparatus data is audio-related information such as driver's favorite radio frequency selection, volume control, CD EQ setup, and information data related to driver's convenience such as vehicle cabin temperature, side view mirror adjustments, driver's seat height and tilt, steering wheel's position and tilt, and so on, but may include data relating to all device controls which can be electronically controlled in the central control unit of a vehicle(S1320). Further, the SCU 103 reads present convenience apparatus setting values(A) from the fourth memory 304(S1325) and compares the values A with the convenience apparatus setting values B from the smartcard stored in the RAM 306(S1330). In case that the present convenience apparatus setting values A and the values B stored in the smartcard are the same as the comparison results, there is no need to re-set the convenience apparatus, so the SCU 103 proceeds to a step(S1340) for checking if the convenience apparatus is changed during driving. However, if the setting values are not coincident as the comparison result, the SCU 103 proceeds to a step for changing the convenience apparatus settings The operations for setting vehicular convenience apparatus in the present invention are carried out by applying signals occurring from the user's switch on/off manipulations to driving devices such as various vehicular actuators, motors, and so on, through vehicular interfaces. Further, the CPU calculates, based on duration times of such signals corresponding vehicular convenience apparatus displacement values (signal duration time*operation speed of a corresponding convenience apparatus actuator or a driving device such as motor or the like) and transfers the displacement values to the fourth memory 304 and the smartcard as convenience apparatus setting values for storage, and, for example, with consideration of the case that a user excessively keeps switching on even though a power side view mirror moves to the left, right, up or down to the maximum, when the user continues to manipulate a convenience apparatus switch beyond an operation range, maximum displacement values to a positive(+) or a negative(−) direction are stored for respective convenience apparatus. Accordingly, the present convenience apparatus setting values A in step S1325 and the values B stored in the smartcard in step S1330 mean convenience apparatus displacement values respectively, the convenience apparatus moves in a positive (+) or negative(−) direction according to the comparison results of the displacement values A and B. For example, if A is larger than B as the comparison results of the displacement values A and B, the convenience apparatus moves in the negative direction by the differences between values A and values B (S1331), and, if A is less than B, the convenience apparatus moves in the positive direction by the differences between values A and values B(S1333). After having moved the convenience apparatus by the differences between values A and values B, the presently changed convenience apparatus setting values are stored in the fourth memory 304 of the SCU, and a step S1330 proceeds for comparing with the values B stored in the smartcard.

In the meantime, in state that the smartcard is not inserted, in case that a vehicle key is inserted, the inserted smartcard is not authenticated, or the present convenience apparatus setting values are the same as the setting values stored in the smartcard, the CPU monitor's the changes of various convenience apparatus switches and the like in a manner of interrupt, timer loop, or the like, and checks whether the convenience apparatus settings are changed by the user (S1340). If the CPU detects convenience apparatus setting values changed by a monitoring routine, the CPU checks which of the various convenience apparatus settings is changed(S1350), and detects the displacement values by the differences changed by the user(S1355). Thereafter, the vehicular central processing unit loads setting values corresponding to the changed convenience apparatus items from the fourth memory 304 of the SCU(S1360), and calculates final absolute displacement values by adding the changed displacement values to the displacement values stored in the SCU(S1365), and updates convenience apparatus setting information by storing again the calculated values in the fourth memory 304 of the SCU(S1370).

The SCU checks whether the smartcard is inserted in order to update again the smartcard with the updated convenience apparatus setting information(S1375), and, since the latest convenience apparatus setting data can not be updated if the smartcard is not inserted, that is, in case that the smartcard is inserted at the beginning but removed later, or not inserted from the beginning, a step S1340 proceeds for checking whether other setting data is changed. If the smartcard is inserted in the SCU after updating new data in the memory of the SCU, a step S1380 proceeds for authenticating the smartcard so that the smartcard is authenticated in the same way as the above step S1315. The authentication step S1380 is required for the case that the smartcard first inserted is replaced with a different smartcard in the middle or the smartcard is inserted later. If the smartcard inserted is not authenticated since it does not belong to the present vehicle, the changed data can not be updated into the smartcard so that the step S1340 proceeds for checking whether new convenience apparatus settings are changed, and, if authenticated, the latest convenience apparatus setting data stored in the fourth memory 304 is updated into the smartcard(S1385). After the data changed by the smartcard is updated, it is checked whether a vehicle key is removed, that is, whether a user is still driving his vehicle(S1390), and, if the vehicle key is not removed, other convenience apparatus settings may be changed so that the step S1340 again proceeds for checking the settings, and, if the vehicle key is removed, the steps for automatically setting and updating the convenience apparatus become complete.

With the aforementioned structure, the first memory 301 of the smartcard control unit (SCU) stores the latest information sensed from various vehicular control units and sensors all the time, and, further, the smartcard stores the latest maintenance data, so that the information and the data are updated to each other when the smartcard is inserted in the SCU.

By using the data stored in the smartcard 101 and the SCU 103, a vehicle driver transfers the vehicle problems and the latest maintenance data stored in the smartcard through a network under on-line environments so as to receive vehicle diagnoses being carried out in the central A/S center main server 140 or, in case that the on-line environments are not built up, the driver uses programs running in an independent device such as PCs and the like so that the driver can grasp various vehicular problems in a convenient and simple manner and work on self diagnoses enabling to determine various consumables replacement periods and states, to thereby enable to reduce the time and cost required in the existing maintenance/repair forms.

Repair shops use the log data stored in the smartcard as well as diagnosis results transferred from the central A/S center to enable objective and expert vehicle maintenance as to diverse vehicle problems occurring intermittently or continuously, thereby enhancing maintenance reliability and reducing the required time and cost. Further, such maintenance results are stored in the smartcard and used afterward when necessary, so that systematic and integral vehicle maintenance can be carried out.

Further, a vehicle user, even under circumstances in which a network is not connected, transfers maintenance information data stored in the smartcard to a smartcard terminal (for example, PC) and carries out vehicle diagnoses on a program as simple self diagnoses, so there is an effect of reducing time and cost.

However, even though a repair shop does not have various network interface environments, a vehicle user reads in the log data stored in the smartcard in use of only his own smartcard through executing an application program in an independent PC or terminal, to thereby enable effective vehicle maintenance.

In the meantime, a driver inserts the smartcard in the SCU upon riding a vehicle and read out the driver convenience information data of the smartcard into the memory of the SCU to enable the convenience apparatus to be automatically controlled, and, changed items as to the convenience apparatus controlled during driving are automatically stored in the SCU and the smartcard so that the driver can use the convenience apparatus without need to control them every time the driver gets in his vehicle.

Further, a vehicle maker, since an individual or a repair shop transfers data stored in the smartcard to the central A/S center main server 140 in on-line environments for maintenance and diagnoses, can build up an expert database by using the data, have statistical data according to vehicle kind, year, and so on, based on these accumulated materials, recognize in advance problems frequently occurring as to the same vehicle kind and solutions to the problems, flexibly meet vehicle troubles by securing a proper stock level of vehicle parts and the like, and provide better A/S, so that there is an effect being able to provide services distinct over other makers as well as a cost-effective advantage resulting from enabling to effectively secure a stock of vehicle parts. Further, such database materials can be used as very useful ones when developing new vehicles.

The embodiments of the present invention described so far is exemplary, and all the changes and modifications as to the embodiment should be understood as belonging to the scope of claims expressly defined below.

We claim:

1. A system for collecting vehicle data and diagnosing a vehicle, comprising:
    a smartcard having vehicle-related data containing basic vehicle information data and vehicle maintenance information data; and
    a smartcard control unit (SCU) connected to electronic control units, mechanical control units, and sensors within the vehicle, and for collecting vehicular information, reading the vehicle-related data from the smartcard, or storing the collected vehicular information in the smartcard, wherein the smartcard control unit includes:
    a vehicle interface for inputting data as to vehicle states from the mechanical control units, the electronic control units, and the sensors inside the vehicle;
    a first memory for storing data indicating vehicle states collected from the control units and sensors through the vehicle interface;
    a second memory for storing data transferred from the smartcard as to vehicle diagnosis and maintenance items;
    a third memory for storing vehicle-inherent information data;
    a card interface for interfacing the smartcard and the smartcard control unit;
    a processor for controlling the vehicle interface, first memory, second memory, third memory, and card interface, and performing calculation; and
    a memory part including a program for controlling the processor.

2. The system as claimed in claim 1, further comprising a terminal for reading the vehicle-related data from the smartcard, carrying out diagnoses, and storing results in the smartcard.

3. The system as claimed in claim 1 or 2, wherein the basic vehicle information data of the smartcard includes information data as to vehicle-inherent information data and information data as to an owner of the vehicle, and the vehicle maintenance information data of the smartcard includes information data outputted from various vehicular control units and sensors and data inputted from exterior as to vehicle diagnoses and maintenance.

4. The system as claimed in claim 3, wherein the vehicle-inherent information data is stored in a memory part included in the smartcard control unit upon vehicle delivery, and stored from the smartcard control unit to the smartcard upon resetting the smartcard.

5. The system as claimed in claim 4, wherein the vehicle-inherent information data includes more than one out of a vehicle delivery date, frame number, engine number, vehicle kind, year, and displacement volume as to the vehicle.

6. The system as claimed in claim 3, wherein the information data as to the vehicle owner includes more than one out of purchase date, vehicle owner's name, resident registration number, driver's license number, password, and email address.

7. The system as claimed in claim 1, wherein the smartcard control unit includes an exterior display device for displaying present states of the smartcard control unit or displaying communication states between the smartcard and the smartcard control unit and vehicle trouble messages.

8. The system as claimed in claim 7, wherein the exterior display device is implemented in connection with an audio display, navigation system, or an auto PC which are mounted in the vehicle.

9. The system as claimed in claim 1, wherein the first memory includes more than one out of information as to vehicular normal or abnormal state which is inputted from a self diagnosis connector mounted in the vehicle, and represented as error codes of the vehicle, a vehicle speed on the run detected from sensors attached in the vehicle, an average RPM obtained by an injector driving signal while driving, and an engine state.

10. The system as claimed in claim 1, wherein the second memory includes more than one out of A/S dates, A/S items, maintenance contents, replacement parts, and maintenance shop records as data as to vehicle maintenance.

11. The system as claimed in claim 1, wherein the vehicle interface includes:
    a connector interface connecting plural self diagnosis connectors and the smartcard control unit;
    a sensor interface for transferring vehicle sensor output values to the smartcard control unit; and
    an interrupt interface for decoding interrupts for changing convenience apparatus setting values stored in the smartcard control unit, when convenience apparatus setting values are changed on the run, and for transferring convenience apparatus change signals.

12. The system as claimed in claim 11, wherein the sensor interface includes an A/D converter for converting signals inputted from vehicle speed sensors, injector driving signals, throttle valve position sensors, air volume sensors, temperature sensors, and intake air sensors, and for transferring the signals to a CPU.

13. The system as claimed in claim 2, wherein the terminal includes:
    a card terminal for reading the vehicle-related data from the smartcard and for storing processed vehicle-related data in the smartcard; and
    a data processing means for outputting the to the card terminal the diagnosis results and maintenance items as to the data read from the smartcard and for storing the diagnosis results and maintenance items in the smartcard.

14. The system as claimed in claim 13, wherein the data processing means includes a personal computer (PC) for executing a vehicle diagnosis program as to the vehicle-related data read from the smartcard, diagnosing the vehicle, and displaying maintenance items based on diagnosis results.

15. The system as claimed in claim 13, further comprising a central A/S center main server connected to the card terminal through a network, and for checking the vehicle diagnoses and maintenance items as to the data of the smartcard received from the card terminal, and transferring to the card terminal and storing in the smartcard the diagnosis results and required maintenance items.

16. The system as claimed in claim 15, wherein the data processing means is a mobile communication terminal or a PC connectable to the network.

17. The system as claimed in claim 15, wherein the central A/S center main server includes:

a knowledge database containing error codes and combined error codes occurrable as to vehicle trouble states, and diagnosis rules and procedures as to the codes; and an inference means for diagnosing the vehicle by applying to the data received from the smartcard the vehicle diagnosis rules and diagnosis determination procedures received from the knowledge database.

18. The system as claimed in claim 17, wherein the central A/S center main server further comprises a vehicle diagnosis result database for receiving and storing the vehicle diagnosis results from the inference means, and storing through a web interface consumers' complaints and vehicle problems as to the diagnosis results.

19. The system as claimed in claim 18, wherein the central A/S center main server further comprises a knowledge acquisition system for converting the diagnosis results stored in the vehicle diagnosis result database to a format storable in the knowledge database, and the inference means diagnoses the vehicle by applying to the data received from the smartcard the vehicle diagnosis rules and diagnosis determination procedures received from the knowledge database.

20. A method for collecting vehicle data by using a smartcard and a smartcard control unit reading vehicle-related information from the smartcard and storing in the smartcard the data collected from control units and sensors inside a vehicle, comprising steps of:

(a) transferring self diagnosis commands to the respective control units inside the vehicle and receiving responses to the self diagnosis commands;

(b) determining whether the received responses are normal ones and, if not normal, storing in the smartcard control unit error codes received as the responses;

(c) determining whether the smartcard is inserted and authenticating the inserted smartcard;

(d) storing in the authenticated smartcard the error codes stored in the smartcard control unit; and (e) comparing the smartcard control unit data and the smartcard data and, if different, updating the data stored in the smartcard control unit and the smartcard.

21. The method as claimed in claim 20, wherein the step(b) determines if a certain setting time has lapsed, and, if the setting time has lapsed, collects output signals from vehicle speed sensors, injector driving signals, and electronic sensors and analyzes vehicle driving states/driver's characteristics, stores the analysis results and the collected output values in the smartcard control unit, and, if the setting time has not lapsed, performs the step(a).

22. The method as claimed in claim 20, wherein the step(c) and the step(e) are performed preceding the step(a).

23. The method as claimed in claim 22, wherein the step(e) compares the values such as the latest updated dates, mileages, accumulated update number of times and the like and updates old data based on the latest updated data.

24. The method as claimed in any of claims 20 to 23, wherein the step for authenticating the smartcard is performed by comparing vehicle-inherent information containing more than one out of a vehicle delivery date, frame number, engine number, vehicle kind, year, displacement volume stored in the vehicle control unit and the information stored in the smartcard.

25. A method for diagnosing a vehicle by using the smartcard including the information collected through any of claims 20 to 23, comprising steps of:

executing a vehicle diagnosis program in a terminal;

inserting the smartcard in the terminal and authenticating whether diagnosing the smartcard by the program is available;

reading the vehicle-related data stored in the authenticated smartcard;

executing the diagnosis program as to the read vehicle-related data and performing vehicle diagnosis; and displaying the diagnosis results on the terminal.

26. The method as claimed in claim 25, wherein the step for performing the vehicle diagnosis is performed by an inference engine diagnosing the vehicle by applying to the data received from the smartcard vehicle diagnosis rules and diagnosis determination procedures received from a knowledge database including error codes and combined error codes occurrable as to vehicle trouble states, and the diagnosis rules and procedures as to the codes.

27. The method as claimed in claim 26, further comprising a step for storing in the smartcard data as to the diagnosis results and maintenance items processed based on the diagnosis results.

28. The method as claimed in claim 27, further comprising a step for transferring the diagnosis results and the data as to the maintenance items processed based on the diagnosis results to a central A/S center connected with the terminal through a network and storing the diagnosis results and the data in a vehicle diagnosis result database of the central A/S center.

29. A method for diagnosing a vehicle by using the smartcard including the information collected through any of claims 20 to 23, comprising steps of:

inserting the smartcard in a terminal;

connecting the terminal to a main server of a central A/S center through a network and authenticating whether the smartcard is available for services by the main server of the central A/S center;

transferring the collected vehicle-related data from the smartcard to the main server of the central A/S center if the smartcard is authenticated;

diagnosing the vehicle based on the collected vehicle-related data and storing the diagnosis results; and transferring the diagnosis results to the terminal, displaying the results on the terminal, and storing the results in the smartcard.

30. The method as claimed in claim 29, wherein the step for diagnosing the vehicle is performed by a knowledge database including error codes and combined error codes occurrable as to vehicle trouble states and the diagnosis rules and procedures to the codes, and an inference means diagnosing the vehicle by applying to the data received from the smartcard the vehicle diagnosis rules and diagnosis determination procedures received from a knowledge acquisition system for converting into a format storable in the knowledge database the data from a vehicle diagnosis result database for receiving and recording the vehicle diagnosis results and storing consumers' complaints and problems as to the vehicle diagnosis results.

31. A method for automatically setting convenience apparatus inside a vehicle by using a smartcard including convenience apparatus setting information data of a user, comprising steps of:

(a) checking if the vehicle is in operation after a vehicle key is inserted and, in case that the vehicle is not in operation, checking if the smartcard is inserted in a smartcard control unit;

(b) reading the convenience apparatus setting data from the smartcard and loading the convenience apparatus setting values stored in the smartcard control unit by the smartcard control unit;

(c) comparing the convenience apparatus setting values stored in the smartcard and the setting values loaded from the smartcard control unit, and, if the both values are different, changing the convenience apparatus settings into the smartcard setting values;

(d) monitoring the convenience apparatus setting changes, and, if the convenience apparatus settings are changed, detecting the change items and displacement values, and calculating absolute displacement values; and (e) updating new convenience apparatus setting values to the smartcard control unit, checking if the smartcard is inserted, and updating the change items from the smartcard control unit to the inserted smartcard.

32. The method as claimed in claim 31, wherein the step(a) and the step(e) further comprise a step for authenticating whether the inserted smartcard is a smartcard belonging to a vehicle in which a driver rides at present.

33. The method as claimed in claim 32, wherein the step for authenticating the smartcard is performed by comparing whether an authentication key of the smartcard generated by using vehicle-inherent number and the like such as vehicle frame number, engine block number, and the like, and an authentication key of the smartcard control unit are coincident with each other.

34. The method as claimed in claim 31, wherein the step(c) comprises steps of:

moving the convenience apparatus in a negative(−) direction if the present convenience apparatus setting values stored in the smartcard control unit are larger than the convenience apparatus setting values read from the smartoard, or in a positive(+) direction if the present convenience apparatus setting values stored in the smartcard control unit are smaller than the convenience apparatus setting values read from the smartcard; and storing setting values of the moved convenience apparatus in the smartcard control unit and comparing the setting values with the convenience apparatus setting values read from the smartcard.

35. The method as claimed in claim 31, wherein the step(d) adds the changed displacement values to the displacement values stored in the smartcard control unit and calculates absolute displacement values.

* * * * *